(12) United States Patent
Hart et al.

(10) Patent No.: US 10,991,270 B2
(45) Date of Patent: Apr. 27, 2021

(54) ADVANCED SURGICAL SIMULATION CONSTRUCTIONS AND METHODS

(71) Applicant: Applied Medical Resources Corporation, Rancho Santa Margarita, CA (US)

(72) Inventors: Charles C. Hart, Rancho Santa Margarita, CA (US); Eduardo Bolanos, Rancho Santa Margarita, CA (US); Sam Chehayeb, Lake Forest, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 252 days.

(21) Appl. No.: 15/927,968

(22) Filed: Mar. 21, 2018

(65) Prior Publication Data

US 2018/0211565 A1   Jul. 26, 2018

Related U.S. Application Data

(63) Continuation of application No. 14/195,327, filed on Mar. 3, 2014, now Pat. No. 9,940,849.

(Continued)

(51) Int. Cl.
*G09B 23/30* (2006.01)
*G09B 23/28* (2006.01)

(52) U.S. Cl.
CPC ............. *G09B 23/30* (2013.01); *G09B 23/28* (2013.01); *G09B 23/285* (2013.01)

(58) Field of Classification Search
CPC ....... G09B 23/30; G09B 23/285; G09B 23/28

(Continued)

(56) References Cited

U.S. PATENT DOCUMENTS 3,991,490 A   11/1976   Markman
4,001,951 A   1/1977   Fasse
(Continued)

FOREIGN PATENT DOCUMENTS

CA    2 293 585 A1   12/1998
CN       2421706 Y    2/2001
(Continued)

OTHER PUBLICATIONS

European Patent Office, International Search Report for International Application No. PCT/US2011/053859 A3, dated May 4, 2012, entitled "Portable Laparoscopic Trainer".

(Continued)

*Primary Examiner* — Thomas J Hong
(74) *Attorney, Agent, or Firm* — Thomas Nguyen; Patrick Ikehara

(57) ABSTRACT

A surgical simulation system is provided. The system includes at least one simulated body organ placed upon the base of an organ tray and at least one covering layer placed over the simulated body organ. At least one of the simulated body organ and covering layer includes electro-conductive gel that is operably severable under application of electrical current to simulate electrosurgery in a training environment. The training environment comprises a top cover connected to and spaced apart from a base to define an internal cavity that is partially obstructed from direct observation by a practitioner. The tray, simulated body organs and covering layer are placed inside the internal cavity for the practice of laparoscopic surgical procedures.

14 Claims, 11 Drawing Sheets

Related U.S. Application Data

(60) Provisional application No. 61/771,316, filed on Mar. 1, 2013.

(58) Field of Classification Search
USPC .......................................................... 434/272
See application file for complete search history.

(56) References Cited

U.S. PATENT DOCUMENTS

| | | |
|---|---|---|
| 4,332,569 A | 6/1982 | Burbank |
| 4,371,345 A | 2/1983 | Palmer et al. |
| 4,459,113 A | 7/1984 | Boscaro Gatti et al. |
| 4,481,001 A * | 11/1984 | Graham ............... G09B 23/285 434/267 |
| 4,596,528 A | 6/1986 | Lewis et al. |
| 4,726,772 A | 2/1988 | Amplatz |
| 4,789,340 A | 12/1988 | Zikria |
| 4,907,973 A | 3/1990 | Hon |
| 5,061,187 A | 10/1991 | Jerath |
| 5,104,328 A | 4/1992 | Lounsbury |
| 5,149,270 A | 9/1992 | McKeown |
| 5,180,308 A | 1/1993 | Garito et al. |
| 5,230,630 A | 7/1993 | Burgett |
| 5,273,435 A | 12/1993 | Jacobson |
| 5,295,694 A | 3/1994 | Levin |
| 5,320,537 A | 6/1994 | Watson |
| 5,358,408 A | 10/1994 | Medina |
| 5,368,487 A | 11/1994 | Medina |
| 5,403,191 A | 4/1995 | Tuason |
| 5,425,644 A | 6/1995 | Szinicz |
| 5,425,731 A | 6/1995 | Daniel et al. |
| 5,472,345 A | 12/1995 | Eggert |
| 5,518,406 A | 5/1996 | Waters |
| 5,518,407 A | 5/1996 | Greenfield et al. |
| 5,620,326 A | 4/1997 | Younker |
| 5,722,836 A | 3/1998 | Younker |
| 5,727,948 A | 3/1998 | Jordan |
| 5,769,640 A | 6/1998 | Jacobus et al. |
| 5,775,916 A | 7/1998 | Cooper et al. |
| 5,785,531 A | 7/1998 | Leung |
| 5,800,178 A | 9/1998 | Gillio |
| 5,803,746 A | 9/1998 | Barrie et al. |
| 5,850,033 A | 12/1998 | Mirzeabasov et al. |
| 5,873,732 A | 2/1999 | Hasson |
| 5,873,863 A | 2/1999 | Komlosi |
| 5,908,302 A | 6/1999 | Goldfarb |
| 5,947,743 A | 9/1999 | Hasson |
| 5,951,301 A | 9/1999 | Younker |
| 6,083,008 A | 7/2000 | Yamada et al. |
| 6,234,804 B1 | 5/2001 | Yong |
| 6,271,278 B1 | 8/2001 | Park et al. |
| 6,336,812 B1 | 1/2002 | Cooper et al. |
| 6,398,557 B1 | 6/2002 | Hoballah |
| 6,474,993 B1 | 11/2002 | Grund et al. |
| 6,485,308 B1 | 11/2002 | Goldstein |
| 6,488,507 B1 | 12/2002 | Stoloff et al. |
| 6,511,325 B1 | 1/2003 | Lalka et al. |
| 6,517,354 B1 | 2/2003 | Levy |
| 6,568,941 B1 | 5/2003 | Goldstein |
| 6,589,057 B1 | 7/2003 | Keenan et al. |
| 6,654,000 B2 | 11/2003 | Rosenberg |
| 6,659,776 B1 | 12/2003 | Aumann et al. |
| 6,773,263 B2 | 8/2004 | Nicholls et al. |
| 6,780,016 B1 | 8/2004 | Toly |
| 6,857,878 B1 | 2/2005 | Chosack et al. |
| 6,863,536 B1 | 3/2005 | Fisher et al. |
| 6,866,514 B2 | 3/2005 | Von Roeschlaub et al. |
| 6,887,082 B2 | 5/2005 | Shun |
| 6,929,481 B1 | 8/2005 | Alexander et al. |
| 6,939,138 B2 | 9/2005 | Chosack et al. |
| 6,997,719 B2 | 2/2006 | Wellman et al. |
| 7,008,232 B2 | 3/2006 | Brassel |
| 7,056,123 B2 | 6/2006 | Gregorio et al. |
| 7,080,984 B1 | 7/2006 | Cohen |
| 7,255,565 B2 | 8/2007 | Keegan |
| 7,272,766 B2 | 9/2007 | Sakezles |
| 7,404,716 B2 | 7/2008 | Gregorio et al. |
| 7,419,376 B2 | 9/2008 | Sarvazyan et al. |
| 7,427,199 B2 | 9/2008 | Sakezles |
| 7,465,168 B2 | 12/2008 | Allen et al. |
| 7,467,075 B2 | 12/2008 | Humphries et al. |
| 7,553,159 B1 | 6/2009 | Arnal et al. |
| 7,575,434 B2 | 8/2009 | Palakodeti |
| 7,594,815 B2 | 9/2009 | Toly |
| 7,648,367 B1 | 1/2010 | Makower et al. |
| 7,677,897 B2 | 3/2010 | Sakezles |
| 7,775,916 B1 | 8/2010 | Mahoney |
| 7,780,451 B2 | 8/2010 | Willobee et al. |
| 7,802,990 B2 | 9/2010 | Korndorffer et al. |
| 7,806,696 B2 | 10/2010 | Alexander et al. |
| 7,833,018 B2 | 11/2010 | Alexander et al. |
| 7,837,473 B2 | 11/2010 | Koh |
| 7,850,454 B2 | 12/2010 | Toly |
| 7,857,626 B2 | 12/2010 | Toly |
| 7,866,983 B2 | 1/2011 | Hemphill et al. |
| 7,931,470 B2 | 4/2011 | Alexander et al. |
| 7,931,471 B2 | 4/2011 | Senagore et al. |
| 7,993,140 B2 | 8/2011 | Sakezles |
| 8,007,281 B2 | 8/2011 | Toly |
| 8,007,282 B2 | 8/2011 | Gregorio et al. |
| 8,017,107 B2 | 9/2011 | Thomas et al. |
| 8,297,982 B2 | 10/2012 | Park et al. |
| 8,323,028 B2 | 12/2012 | Matanhelia |
| 8,323,029 B2 | 12/2012 | Toly |
| 8,328,560 B2 | 12/2012 | Niblock et al. |
| 8,403,674 B2 | 3/2013 | Feygin et al. |
| 8,403,675 B2 | 3/2013 | Stoianovici et al. |
| 8,439,687 B1 | 5/2013 | Morriss et al. |
| 8,454,368 B2 | 6/2013 | Ault et al. |
| 8,460,002 B2 | 6/2013 | Wang et al. |
| 8,465,771 B2 | 6/2013 | Wan et al. |
| 8,469,716 B2 | 6/2013 | Fedotov et al. |
| 8,480,407 B2 | 7/2013 | Campbell et al. |
| 8,480,408 B2 | 7/2013 | Ishii et al. |
| 8,556,635 B2 | 10/2013 | Toly |
| 8,613,621 B2 | 12/2013 | Henderickson et al. |
| 8,641,423 B2 | 2/2014 | Gumkowski |
| 8,915,742 B2 | 12/2014 | Hendrickson et al. |
| 9,096,744 B2 | 8/2015 | Wan et al. |
| 9,387,276 B2 | 7/2016 | Sun et al. |
| 9,427,496 B2 | 8/2016 | Sun et al. |
| 2001/0019818 A1 | 9/2001 | Yong |
| 2004/0126746 A1 | 7/2004 | Toly |
| 2004/0248072 A1 | 12/2004 | Gray et al. |
| 2005/0008997 A1 | 1/2005 | Herman |
| 2005/0026125 A1 | 2/2005 | Toly |
| 2005/0064378 A1 | 3/2005 | Toly |
| 2005/0084833 A1 | 4/2005 | Lacey et al. |
| 2005/0142525 A1 | 6/2005 | Cotin et al. |
| 2005/0196739 A1 | 9/2005 | Moriyama |
| 2005/0196740 A1 | 9/2005 | Moriyana |
| 2005/0214727 A1 | 9/2005 | Stoianovici et al. |
| 2006/0046235 A1 | 2/2006 | Alexander et al. |
| 2006/0275741 A1 | 12/2006 | Chewning et al. |
| 2007/0148626 A1 | 6/2007 | Ikeda |
| 2007/0166682 A1 | 7/2007 | Yarin et al. |
| 2007/0275359 A1 | 11/2007 | Rotnes et al. |
| 2008/0032273 A1 | 2/2008 | MacNamara et al. |
| 2008/0064017 A1 | 3/2008 | Grundmeyer, III |
| 2008/0187895 A1 | 8/2008 | Sakezles |
| 2008/0299529 A1 | 12/2008 | Schaller |
| 2008/0317818 A1 | 12/2008 | Griffith et al. |
| 2009/0068627 A1 | 3/2009 | Toly |
| 2009/0142739 A1 | 6/2009 | Wang et al. |
| 2009/0142741 A1 | 6/2009 | Ault et al. |
| 2009/0176196 A1 | 7/2009 | Niblock et al. |
| 2009/0187079 A1 | 7/2009 | Albrecht et al. |
| 2009/0246747 A1 | 10/2009 | Buckman, Jr. |
| 2009/0314550 A1 | 12/2009 | Layton |
| 2010/0099067 A1 | 4/2010 | Agro |
| 2010/0167249 A1 | 7/2010 | Ryan |
| 2010/0167250 A1 | 7/2010 | Ryan et al. |
| 2010/0167253 A1 | 7/2010 | Ryan et al. |
| 2010/0209899 A1 | 8/2010 | Park |

(56) References Cited

U.S. PATENT DOCUMENTS

| | | |
|---|---|---|
| 2010/0248200 A1 | 9/2010 | Ladak |
| 2010/0279263 A1 | 11/2010 | Duryea |
| 2010/0285094 A1 | 11/2010 | Gupta |
| 2011/0020779 A1 | 1/2011 | Hannaford et al. |
| 2011/0200976 A1 | 8/2011 | Hou et al. |
| 2011/0207104 A1 | 8/2011 | Trotta |
| 2011/0281251 A1 | 11/2011 | Mousques |
| 2012/0015339 A1 | 1/2012 | Hendrickson et al. |
| 2012/0045743 A1 | 2/2012 | Misawa et al. |
| 2012/0082970 A1 | 4/2012 | Pravong et al. |
| 2012/0115117 A1 | 5/2012 | Marshall |
| 2012/0115118 A1 | 5/2012 | Marshall |
| 2012/0148994 A1 | 6/2012 | Hori et al. |
| 2012/0164616 A1 | 6/2012 | Endo et al. |
| 2012/0165866 A1 | 6/2012 | Kaiser et al. |
| 2012/0202180 A1 | 8/2012 | Stock et al. |
| 2012/0282584 A1* | 11/2012 | Millon .................. G09B 23/306 434/272 |
| 2012/0308977 A1 | 12/2012 | Tortola |
| 2013/0101973 A1 | 4/2013 | Hoke et al. |
| 2013/0157240 A1 | 6/2013 | Hart et al. |
| 2013/0177890 A1 | 7/2013 | Sakezles |
| 2013/0245681 A1 | 9/2013 | Straehnz et al. |
| 2014/0011172 A1* | 1/2014 | Lowe .................. G09B 23/281 434/273 |
| 2014/0030682 A1 | 1/2014 | Thilenius |
| 2014/0038151 A1 | 2/2014 | Hart |
| 2014/0051049 A1 | 2/2014 | Jarc et al. |
| 2014/0072941 A1 | 3/2014 | Hendrickson et al. |
| 2014/0187855 A1 | 7/2014 | Nagale et al. |
| 2016/0058534 A1 | 3/2016 | Derwin et al. |
| 2016/0125762 A1 | 5/2016 | Becker et al. |
| 2016/0194378 A1 | 7/2016 | Cass et al. |

FOREIGN PATENT DOCUMENTS

| | | |
|---|---|---|
| CN | 2751372 Y | 1/2006 |
| CN | 2909427 Y | 6/2007 |
| CN | 101528780 A | 9/2009 |
| CN | 201364679 Y | 12/2009 |
| CN | 102458496 A | 5/2012 |
| CN | 202563792 U | 11/2012 |
| CN | 202601055 U | 12/2012 |
| CN | 202694651 U | 1/2013 |
| CN | 103050040 A | 4/2013 |
| CN | 203013103 U | 6/2013 |
| CN | 203038549 U | 7/2013 |
| CN | 203338651 U | 12/2013 |
| CN | 203397593 U | 1/2014 |
| CN | 102596275 B | 6/2014 |
| CN | 103845757 A | 6/2014 |
| CN | 103396562 B | 7/2015 |
| CN | 105194740 A | 12/2015 |
| CN | 105504166 A | 4/2016 |
| DE | 91 02 218 U1 | 5/1991 |
| DE | 41 05 892 | 8/1992 |
| DE | 44 14 832 | 11/1995 |
| EP | 1 609 431 A1 | 12/2005 |
| EP | 2 068 295 A2 | 6/2009 |
| EP | 2 218 570 A1 | 8/2010 |
| FR | 2 691 826 | 12/1993 |
| GB | 2488994 A | 9/2012 |
| JP | 10 211160 | 8/1998 |
| JP | 10 211160 A | 8/1998 |
| JP | 2006187566 A | 7/2006 |
| JP | 2009063787 A | 3/2009 |
| JP | 2009236963 A | 10/2009 |
| JP | 2011113056 A | 6/2011 |
| JP | 2013127496 A | 6/2013 |
| KR | 101231565 B1 | 2/2013 |
| PT | 106230 | 9/2013 |
| WO | WO 1999/01074 A1 | 1/1999 |
| WO | WO 2000/36577 | 6/2000 |
| WO | WO 2002/38039 A2 | 5/2002 |
| WO | WO 2002/038039 A3 | 5/2002 |
| WO | WO 2005/071639 A1 | 8/2005 |
| WO | WO 2005/083653 A1 | 9/2005 |
| WO | WO 2007/068360 | 6/2007 |
| WO | WO 2008/103383 A1 | 8/2008 |
| WO | WO 2009/000939 | 12/2008 |
| WO | WO 2009/089614 A1 | 7/2009 |
| WO | WO 2010/094730 A1 | 8/2010 |
| WO | WO 2011/127379 A2 | 10/2011 |
| WO | WO 2012/168287 A1 | 12/2012 |
| WO | WO 2012/175993 A1 | 12/2012 |
| WO | WO 2014/197793 A1 | 12/2014 |
| WO | WO 2016/138528 A1 | 9/2016 |
| WO | WO 216/183412 A1 | 11/2016 |
| WO | WO 2016/198238 A1 | 12/2016 |
| WO | WO 2016/201085 A1 | 12/2016 |
| WO | WO 2017/042301 A1 | 2/2017 |
| WO | WO 2017/042301 A1 | 3/2017 |

OTHER PUBLICATIONS

European Patent Office, The International Search Report and Written Opinion for International Application No. PCT/US2012/60997, dated Mar. 7, 2013, entitled "Simulated Tissue Structure for Surgical Training".

European Patent Office, the International Search Report and Written Opinion for International Application No. PCT/US2012/070971, dated Mar. 18, 2013, entitled "Advanced Surgical Simulation".

Human Patient Simulator, Medical Education Technologies, Inc., http://www.meti.com (1999) all.

The International Bureau of WIPO, International Preliminary Report on Patentability for International Application No. PCT/US2011/053859, titled "Portable Laparoscopic Trainer" dated Apr. 2, 2013.

European Patent Office, The International Search Report and Written Opinion for International Application No. PCT/US2013/062363, entitled "Surgical Training Model for Laparoscopic Procedures," dated Jan. 22, 2014, 11 pgs.

European Patent Office, The International Search Report and Written Opinion for International Application No. PCT/US2013/061949, entitled "Surgical Training Model for Laparoscopic Procedures," dated Feb. 17, 2014, 7 pgs.

Anonymous: Realsim Systems—LTS2000, Sep. 4, 2005, pp. 1-2, XP055096193, Retrieved from the Internet: URL:https://web.archive.org/web/2005090403;3030/http://www.realsimsystems.com/exersizes.htm (retrieved on Jan. 14, 2014).

European Patent Office, The International Search Report and Written Opinion for International Application No. PCT/US2013/062269, entitled "Surgical Training Model for Transluminal Procedures," dated Feb. 17, 2014, 8 pgs.

European Patent Office, The International Search Report and Written Opinion for International Application No. PCT/US2013/061557, entitled "Surgical Training Model for Laparoscopic Procedures," dated Feb. 10, 2014, 9 pgs.

European Patent Office, The International Search Report and Written Opinion for International Application No. PCT/US2013/061728, entitled "Surgical Training Model for Laparoscopic Procedures," dated Oct. 18, 2013, 9 pgs.

Limps and Things, EP Guildford MATTU Hernia Trainer, http://limbsandthings.com/us/products/tep-guildford-mattu-hernia-trainer/, printed May 29, 2014, 11 pgs.

Simulab, Hernia Model, http://www.simulab.com/product/surgery/open/hernia model, printed printed May 29, 2014, 4 pgs.

McGill Laparoscopic Inguinal Hernia Simulator, Novel Low-Cost Simulator for Laparoscopic Inguinal Hernia Repair, Feb. 8, 2011, 1 pg.

University of Wisconsin—Madison Biomedical Engineering, Inguinal Hernia Model, http://bmedesign.engr.wisc.edu/projects/s10/hernia_model/, printed May 29, 2014, 62 pgs.

European Patent Office, The International Search Report and Written Opinion for International Application No. PCT/US2014/019840, entitled "Advanced Surgical Simulation Constructions and Methods," dated Jul. 4, 2014, 8 pgs.

(56) References Cited

OTHER PUBLICATIONS

European Patent Office, The International Search Report and Written Opinion for International Application No. PCT/US2017/039113, entitled "Simulated Abdominal Wall," dated Aug. 7, 2017, 13 pgs.
The International Bureau of WIPO, International Preliminary Report on Patentability for International Application No. PCT/US2016/0032292, entitled "Synthetic Tissue Structures for Electrosurgical Training and Simulation," dated Nov. 23, 2017, 8 pgs.
The International Bureau of WIPO, International Preliminary Report on Patentability for International Application No. PCT/US2016/034591, entitled "Surgical Training Model for Laparoscopic Procedures," dated Dec. 7, 2017, 14 pgs.
The International Bureau of WIPO, International Preliminary Report on Patentability for International Application No. PCT/US2016/036664, entitled "Hysterectomy Model," dated Dec. 21, 2017, 10 pgs.
European Patent Office, Extended European Search Report for European Patent Application No. EP 17202365.7, titled "Gallbladder Model", dated Jan. 31, 2018, 8 pgs.
The International Bureau of WIPO, International Preliminary Report on Patentability for International Application No. PCT/US2016/043277, entitled "Appendectomy Model," dated Feb. 1, 2018, 9 pgs.
The International Bureau of WIPO, International Preliminary Report on Patentability for International Application No. PCT/US2016/055148, entitled "Hysterectomy Model," dated Apr. 12, 2018, 12 pgs.
European Patent Office, The International Search Report and Written Opinion for International Application No. PCT/US2018/018895, entitled "Synthetic Tissue Structures for Electrosurgical Training and Simulation," dated May 17, 2018, 12 pgs.
The International Bureau of WIPO, International Preliminary Report on Patentability for International Application No. PCT/US2016/062669, entitled "Simulated Dissectible Tissue," dated May 31, 2018, 11 pgs.
European Patent Office, The International Search Report and Written Opinion for International Application No. PCT/US2018/018036, entitled "Laparoscopic Training System," dated Jun. 8, 2018, 13 pgs.
European Patent Office, Extended European Search Report for European Patent Application No. EP 18177751.7, titled "Portable Laparoscopic Trainer," dated Jul. 13, 2018, 8 pgs.
European Patent Office, The International Search Report and Written Opinion for International Application No. PCT/US2018/034705, entitled "Laparoscopic Training System," dated Aug. 20, 2018, 14 pgs.
The International Bureau of WIPO, International Preliminary Report on Patentability for International Application No. PCT/US2017/020389, entitled "Simulated Tissue Cartridge," dated Sep. 13, 2018, 8 pgs.
The International Bureau of WIPO, International Preliminary Report on Patentability for International Application No. PCT/US2017/039113, entitled "Simulated Abdominal Wall," dated Jan. 10, 2019, 8 pgs.
European Patent Office, Extended European Search Report for European Patent Application No. EP 18184147.9, titled "First Entry Model," dated Nov. 7, 2018, 7 pgs.
European Patent Office, Extended European Search Report for European Patent Application No. EP 18210006.5, titled "Surgical Training Model for Laparoscopic Procedures," dated Jan. 21, 2019, 7 pgs.
European Patent Office, Extended European Search Report for European Patent Application No. EP 18207214.0, titled "Synthetic Tissue Structures for Electrosurgical Training and Simulation," dated Mar. 28, 2019, 6 pgs.
European Patent Office, Extended European Search Report for European Patent Application No. EP 18216002.8, titled "Surgical Training Model for Laparoscopic Procedures," dated Feb. 4, 2019, 6 pgs.
European Patent Office, Extended European Search Report for European Patent Application No. EP 18216005.1, titled "Surgical Training Model for Laparoscopic Procedures," dated Feb. 4, 2019, 7 pgs.
European Patent Office, Extended European Search Report for European Patent Application No. EP 19159065.2, titled "Simulated Tissue Structures and Methods," dated May 29, 2019, 8 pgs.
The International Bureau of WIPO, International Preliminary Report on Patentability for International Application No. PCT/US2018/018036, entitled "Laparoscopic Training System," dated Aug. 29, 2019, 8 pgs.
The International Bureau of WIPO, International Preliminary Report on Patentability for International Application No. PCT/US2018/018895, entitled "Synthetic Tissue Structures for Electrosurgical Training and Simulation," dated Sep. 6, 2019, 7 pgs.
European Patent Office, Extended European Search Report for European Patent Application No. EP 20153338.7, titled "Advanced Surgical Simulation Constructions and Methods," dated Mar. 5, 2020, 7 pgs.
European Patent Office, Extended European Search Report for European Patent Application No. EP 19215545.5, titled "Advanced First Entry Model for Surgical Simulation," dated Mar. 26, 2020, 8 pgs.
European Patent Office, Extended European Search Report for European Patent Application No. EP 20158500.7, titled "Surgical Training Device," dated May 14, 2020, 9 pgs.
"Surgical Female Pelvic Trainer (SFPT) with Advanced Surgical Uterus," Limbs & Things Limited, Issue 1, Jul. 31, 2003, URL:https://www.accuratesolutions.it/wp-content/uploads/2012/08/Surgical_Female_Pelvic_Trainer_SFPT_with_Advanced_Uterus_User_Guide.pdf, retrieved Feb. 21, 2020, 2 pgs.

* cited by examiner

ADVANCED SURGICAL SIMULATION CONSTRUCTIONS AND METHODS

CROSS-REFERENCE TO RELATED APPLICATIONS

This application is a continuation of U.S. patent application Ser. No. 14/195,327 filed Mar. 3, 2014 entitled "Advanced surgical simulation constructions and methods" which claims priority to and benefit of U.S. Provisional Patent Application Ser. No. 61/771,316 filed on Mar. 1, 2013 entitled "Advanced surgical simulation constructions and methods" which are incorporated herein by reference in their entirety.

FIELD OF THE INVENTION

This application is generally related to surgical training tools, and in particular, to anatomical models simulating organs or tissue for teaching and practicing various surgical techniques and procedures.

BACKGROUND OF THE INVENTION

Medical students as well as experienced doctors learning new surgical techniques must undergo extensive training before they are qualified to perform surgery on human patients. The training must teach proper techniques employing various medical devices for cutting, penetrating, clamping, grasping, stapling and suturing a variety of tissue types. The range of possibilities that a trainee may encounter is great. For example, different organs and patient anatomies and diseases are presented. The thickness and consistency of the various tissue layers will also vary from one part of the body to the next and from one patient to another. Accordingly, the skills required of the techniques and instruments will also vary. Furthermore, the trainee must practice techniques in readily accessible open surgical locations and in locations accessed laparoscopically.

Numerous teaching aids, trainers, simulators and model organs are available for one or more aspects of surgical training. However, there is a need for model organs or simulated tissue elements that are likely to be encountered in endoscopic, laparoscopic, transanal, minimally invasive or other surgical procedures that include the removal of tumors or other tissue structures. For example, there is a need for realistic model organs for the repeatable practice of removing a tumor or other undesired tissue followed by the closure of the target area by suturing or stapling as part of the same surgical procedure.

In view of the above, it is an object of this invention to provide a surgical training device that realistically simulates such particular circumstances encountered during surgery. The medical training and simulation systems and devices of the present invention provide a user with visual, tactile and technical properties that emulate the situations extant in live surgical procedures. Emulation is an effort to equal or surpass real surgical conditions or effects in a surgical simulation.

In order to simplify training and minimize the use of cadavers in surgical training and in practice, the present invention contemplates the use of synthetic materials that are compounded, configured and combined to emulate the properties, responses and characteristics of human or animal tissue under surgical conditions and in response to the activities of surgical instruments. Such conditions and activities may include incision, penetration, dissection, occlusion, anastomosis, approximation, ablation, and the like.

Many surgical procedures involve the use of energy-based surgical instruments such as electrosurgical blades, probes, scissors, graspers, dissectors and the like. Electrosurgery is generally considered the application of high voltage, high frequency electrical energy to tissue for the purpose of cutting or destroying. Electrocautery is a type of electrosurgery in which an electrical current generates resistance heating in the instrument, which is sufficiently high to apply to tissue for the purpose of cutting or destroying tissue. Additionally, many procedures make use of energy devices based on high frequency sound. These instruments provide a surgeon with the convenience of nearly effortless cutting and dissection and nearly instant thermal hemostasis. Such instruments have become a standard within the surgical community and are used regularly.

It becomes readily apparent that any fake organs or organ simulation modules or training modules must include the ability to train in the use of energy-based surgical instruments. Many of the existing training or simulation modules require the use of harvested animal tissue, synthetic materials that must be wetted or infused with saline solution or materials having embedded metallic particles so that they are electrically conductive and suitable for energy-based surgical technique training. The most preferred synthetic materials such as silicone rubber, latex, vinyl, polyester, polyurethane and the like do not respond to energy-based surgical instruments and devices in a way that satisfies the need to train users to use the instruments in an actual surgical procedure. Therefore, one aspect of the present invention is to provide a combination of synthetic materials, some that have dielectric characteristics, and some that are electrically conductive and yet mimic the physical properties of natural tissue and action of energy-based surgical instruments and devices. In addition, the present invention provides a method for constructing various body parts, conduits, organs, cysts, tumors and the like that provides life-like synthetic samples.

SUMMARY OF THE INVENTION

According to one aspect of the invention a surgical simulation system is provided. The surgical simulation system includes a tray having a base with a perimeter and one or more anatomical receptacle portion formed by at least one upstanding wall configured to substantially cooperate and conform in size and shape with one or more simulated body organ located within the one or more receptacle portion. The system includes one or more simulated body organ placed upon the base within the one or more receptacle portion. At least one covering layer is placed over the one or more simulated body organ. The covering layer is attached to the one or more simulated body organ in at least one location. The least one of the one or more simulated body organ and covering layer includes electro-conductive gel operably severable under application of electrical current to simulate electrosurgery in a training environment.

According to another aspect of the invention, a surgical simulation system for the practice of electrosurgical activity is provided. The surgical simulation system includes a simulated tissue structure that includes an inner layer that is adjacent to and in contact with an outer layer. The inner layer comprises a foam material and the outer layer comprises an elastomeric hydrogel. The inner layer defines an interior cavity and both the inner layer and the outer layer define a shape of at least a portion of a uterus. The surgical simulation system also includes a simulated pathology located adjacent to or embedded in the inner layer. The simulated pathology is removable from the simulated tissue structure. The elastomeric hydrogel is electo-conductive such that it is operably severable under application of electrical current to simulate electrosurgery in a training environment.

According to another aspect of the invention, a method for surgical simulation is provided. The method includes the step of providing an organ tray having a base with one or more simulated body organ on it. A covering layer is placed over the one or more simulated body organ. The covering layer includes a first planar layer of non-conductive material and a second planar layer of electro-conductive gel. The covering layer is placed over the one or more simulated body organ such that the second layer is adjacent to the one or more simulated body organ. The organ tray is placed into an internal cavity of a surgical training device such that the organ tray is at least partially obstructed from direct visual observation by a practitioner. The surgical training device includes a top cover spaced apart from the base. The internal cavity is defined between the top cover and base. The surgical training device includes an aperture or penetrable simulated tissue region in the top cover. The method further includes the step of inserting a scope configured to capture video of the internal cavity through the aperture or penetrable simulated tissue region and into the internal cavity of the training device. At least one instrument is inserted through the aperture or penetrable simulated tissue region into the internal cavity of the training device. The method includes the step of separating the first layer from the second layer with the at least one instrument.

According to one aspect of the invention, a method of making a simulated tumor is provided. The tumor is made by mixing uncured silicone rubber with untreated fumed silicon dioxide. The mixture is then shaped and cured to form a simulated tumor.

According to one aspect of the invention, a simulated tissue structure for surgical training is provided. The structure includes an organ tray, simulated organs placed on the tray and a covering layer. The covering layer includes a semi-transparent sheet of silicone rubber.

According to one aspect of the invention, a simulated tissue structure for surgical training is provided. The structure includes an organ tray, simulated organs placed on the tray and a covering layer. The covering layer includes a semi-transparent sheet of silicone rubber and a semi-transparent sheet of hydrogel material.

According to one aspect of the invention, a method for forming a covering layer for a tray containing simulated tissue includes the step of mixing electro-conductive material such as platinum or tin into liquid silicone. The mixture is spread onto a first layer of polyethylene foam. A second layer of polyethylene foam is placed over the silicone layer. A textured roller or stamping device is moved over the surface of the second layer of foam to calendar the silicone material between the foam layers of foam. The silicone layer is removed from between the foam layers.

According to another aspect of the invention, a simulated organ model of a uterus is provided. The model includes an outer shell of soft silicone and an inner layer of foam with simulated tumors located between the outer shell and inner layer.

According to another aspect of the invention, a simulated organ model of a uterus is provided. The model includes an outer shell of soft silicone and an inner layer of foam with simulated tumors located inside the inner foam layer.

According to another aspect of the invention, a simulated organ model of a uterus is provided. The model includes fallopian tubes of silicone containing electro-conductive material. The fallopian tube includes a lumen extending between a first end and a second end and a bulbous portion near the second end that transitions to a funnel shape at the second end having a plurality of axial cuts in the funnel portion. At least a portion of the lumen includes a soft fibrous material.

According to another aspect of the invention, a simulated organ model of a uterus is provided. The model includes fallopian tubes of silicone containing electro-conductive material. The fallopian tube includes a lumen extending between a first end and a second end and a bulbous portion near the second end that transitions to a funnel shaped at the second end having a plurality of axial cuts in the funnel portion. At least a portion of the lumen includes a soft fibrous material and a simulated ectopic pregnancy is placed inside the bulbous portion. The simulated ectopic pregnancy is made of silicone rubber and untreated fumed silicon dioxide.

According to another aspect of the invention, a simulated organ model of a stomach is provided. The model includes a hollow stomach-shaped bladder having a proximal opening and a distal opening. The model includes a predetermined pathway for practicing resection of at least a portion of the stomach along the predetermined pathway. The predetermined pathway is defined by a portion of two opposing inner surfaces of the stomach model being joined together.

According to another aspect of the invention, a tray for receiving model organs is provided. The tray includes a bottom surface and at least one receptacle portion for receiving at least one organ. The at least one receptacle portion is formed by upstanding walls having a height and shape that substantially conforms to the height, shape and size of the organ to be placed into the receptacle portion.

DETAILED DESCRIPTION OF THE INVENTION

Figure 1:
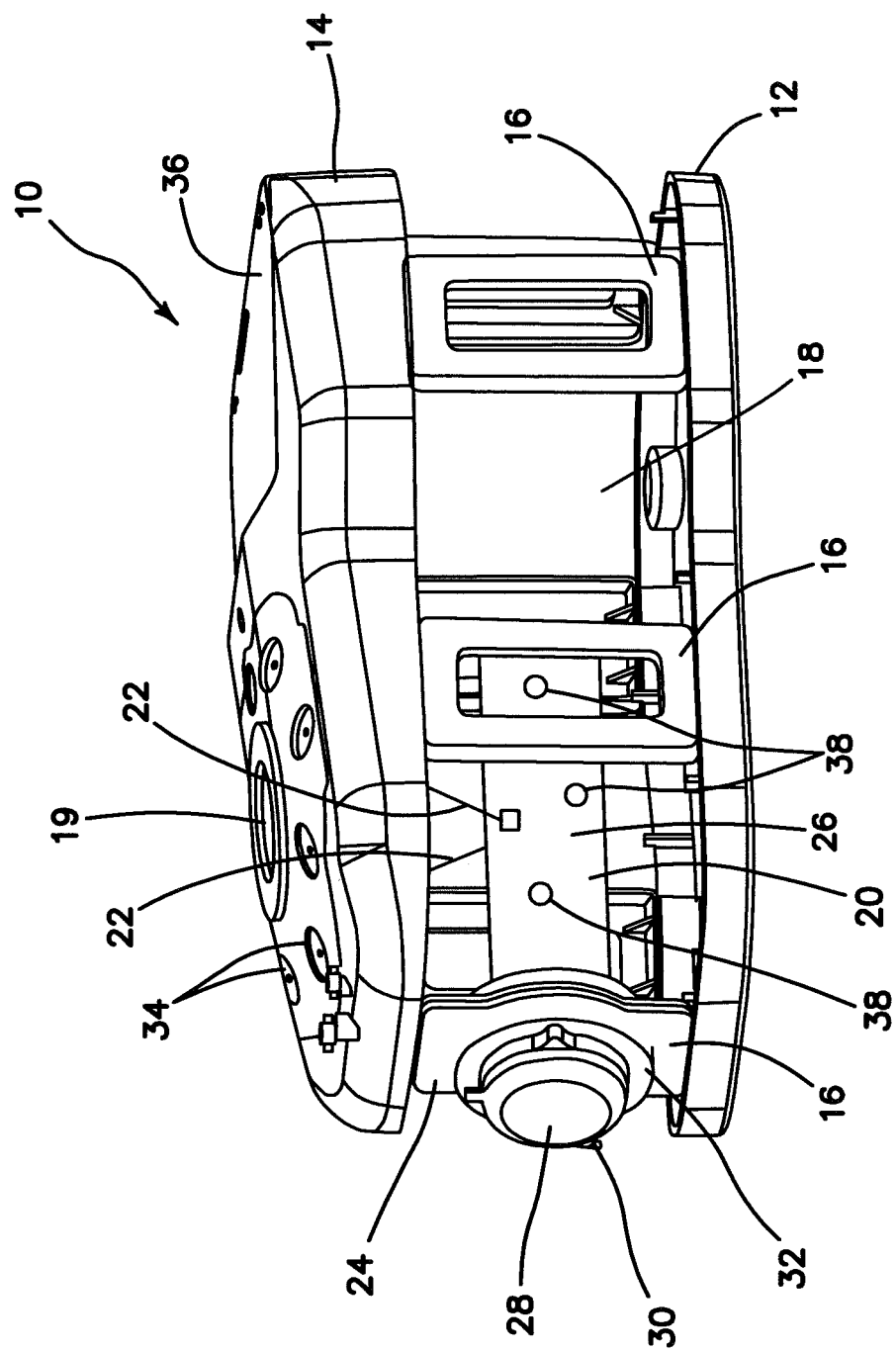
FIG. 1 illustrates a side view of a surgical training device with a model organ according to the present invention.

A surgical training device 10 that is configured to mimic the torso of a patient such as the abdominal region is shown in FIG. 1. The surgical training device 10 provides a simulated body cavity 18 substantially obscured from the user for receiving model organs or simulated or live tissue 20. The body cavity 18 is accessed via a tissue simulation region 19 that is penetrated by the user employing devices to practice surgical techniques on the tissue or organ 20 found located in the body cavity 18. Although the body cavity 18 is shown to be accessible through a tissue simulation region 19, a hand-assisted access device or single-site port device may be alternatively employed to access the body cavity 18 as described in U.S. patent application Ser. No. 13/248,449 entitled "Portable Laparoscopic Trainer" filed on Sep. 29, 2011 and incorporated herein by reference in its entirety. The surgical training device 10 is particularly well suited for practicing laparoscopic or other minimally invasive surgical procedures.

The surgical training device 10 includes a base 12 and a top cover 14 connected to and spaced apart from the base 12 to define an internal body cavity 18 between the top cover 14 and the base 12. At least one leg 16 interconnects and spaces apart the top cover 14 and base 12. A model organ or simulated tissue 20 is disposed within the body cavity 18. The model organ 20 shown in FIG. 1 is a partial colon or intestine that is shown suspended from the top cover 14 by tethers 22 and connected to at least one leg 24. The at least one leg 24 has an aperture (not shown) facing the internal body cavity 18. The model colon 20 includes a tube 26 having a proximal end and a distal end. The proximal end of the tube 26 is interconnected with the aperture of the leg 24 such that the aperture provides an access port to the lumen of the tube 26. The access port and aperture is shown to be closed off in FIG. 1 with an access device 28 which in combination with a sealed distal end of the tube 26 provides a model organ 20 that is adapted for insufflation with fluid deliverable via an insufflation port 30. An optional insert 32 made of soft material such as silicone creates a realistic interface for the access port. The distal end of the tube 26 extends into the body cavity 18 and is suspended within the body cavity 18. The interior of the tube 26 of the simulated organ 20 is accessible via the access port of leg 24 or via the tissue simulation region 19 or instrument insertion ports 34. An endoscopic camera inserted into the body cavity 18 or into the organ 20 via the access port generates a live image for display on a fold out video screen 36 shown in the closed position in FIG. 1. An endoscope is a visualization device that is used to view a hollow structure. Although the simulated organ 20 of FIG. 1 is ideal for practicing procedures related to transanal minimally invasive surgery, any simulated organ or tissue portion may be employed. One particular aspect of the organ 20 is at least one tumor or defect 38 is provided and connected to the organ. As shown in FIG. 1, the tumor 38 is connected to the wall of the organ tube 26.

Figure 2A:
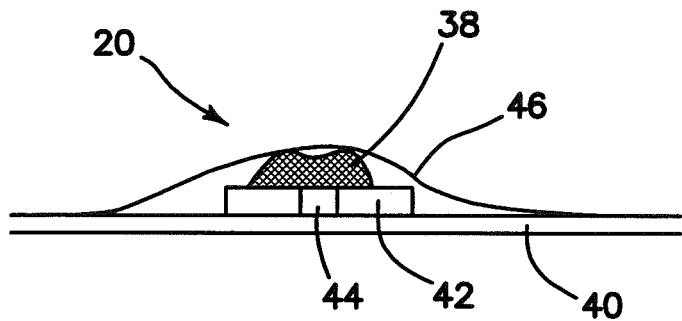
FIG. 2A illustrates a side cross-sectional view of a simulated tissue structure according to the present invention.

Turning now to FIG. 2A there is shown a partial side cross-sectional view of a portion of a simulated organ 20 that includes the tumor 38. The simulated organ or tissue 20 includes a base layer or organ wall 40. The organ wall 40 is made from a material configured to mimic real live tissue such as silicone or other polymer and is dyed appropriately. One or more base layers 40 of varying thicknesses and colorations may be employed to comprise the entirety of the wall 40. In one variation, the organ wall 40 is rigid and made of polymeric material. Above the base layer 40 is a second layer or defect layer 42. The defect layer 42 is the same size or smaller than the base layer 40 forming a raised platform for the tumor 38. The defect layer 42 is connected to the base layer 40 by adhesive or other means known to one having ordinary skill in the art including being integrally formed with the base layer 40 as a single unit. The defect layer 42 is made of silicone and in one variation of the same color as the base layer 40 such that the defect layer 42 blends into the background of the base layer 40. The defect layer 42 includes at least one defect or gap 44. In one variation, the defect 44 is a pre-fabricated breach in the defect layer 42 that mimics an incision, gap or other void in real tissue resulting from a tear, cut, removal or other surgical procedure that requires surgical attention by way of suturing, stapling or the like to close the defect. Such a situation arises most often in the removal of a tumor 38 where surrounding tissue is also removed together with the tumor 38 to preventatively ensure the entirety of the tumor is excised leaving behind a remnant defect in the tissue. The defect 44 comprises two opposed sides or surfaces defining a gap therebetween. Although the adjacent sides or surfaces are shown to be vertical with respect to the base layer 40, the invention is not so limited and the juxtaposed surfaces or sides can have any shape and, for example, be curved. The defect 44 can be any shape as will be discussed with respect to FIGS. 3A-3F.

Figure 3A:
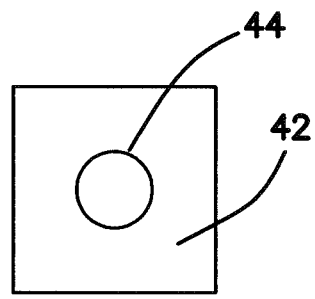
FIG. 3A illustrates a top view of a defect layer having a circular shaped defect according to the present invention.
Figure 3B:
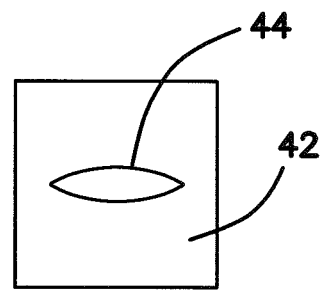
FIG. 3B illustrates a top view of a defect layer having an elongated defect according to the present invention.
Figure 3C:
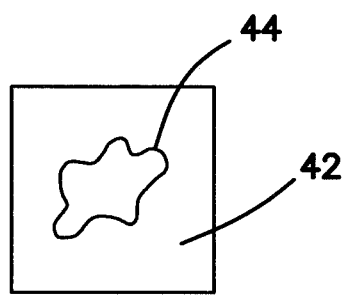
FIG. 3C illustrates a top view of a defect layer having an amorphous defect according to the present invention.
Figure 3D:
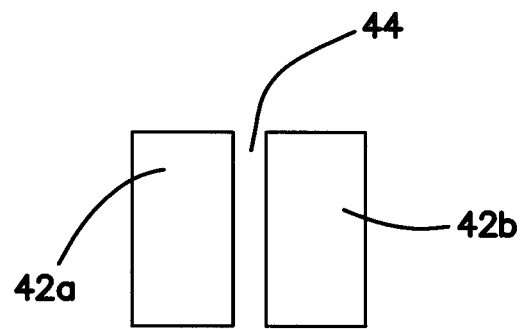
FIG. 3D illustrates a top view of a defect layer having a two-piece defect according to the present invention.
Figure 3E:
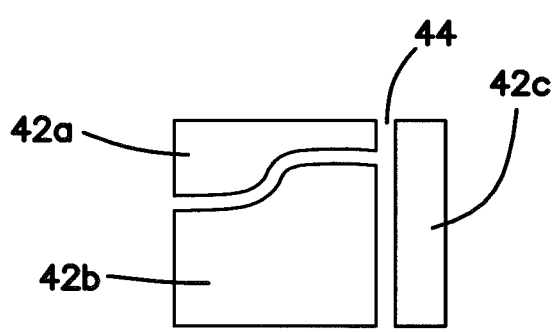
FIG. 3E illustrates a top view of a multi-part defect layer according to the present invention.
Figure 3F:
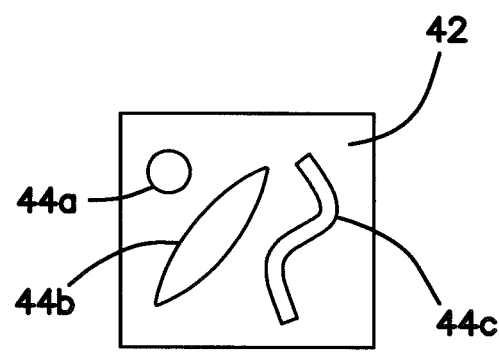
FIG. 3F illustrates a top view of a defect layer having multiple defects according to the present invention.

Turning now to FIG. 3A, there is shown a top view of a defect layer 42 having a circular defect 44. A defect layer 42 with an elongated, oblong or elliptically shaped defect 44 is shown in the FIG. 3B. The defect 44 can be amorphic or any shape as shown in FIG. 3C. The defect layer 42 may be multi-part as shown in FIG. 3D wherein the defect layer 42 includes two or more adjacent defect layer pieces 42a, 42b juxtaposed to create at least one defect 44 therebetween. Another multi-part defect layer 42 is shown in FIG. 3E where a plurality of adjacent defect layer pieces 42a, 42b and 42c form one or more defects 44 therebetween. Of course, a defect layer 42 may include multiple defects 44a, 44b and 44c as shown in FIG. 3F. The defects 44 may all be the same or have different shapes as shown in FIG. 3F. The shape, thickness and size of the defect allow the surgeon trainee to practice suturing across defects of varying difficulty. In one variation, the defect layer 42 is not of equal thickness. Instead, the thickness of the defect layer 42 varies at the defect 44 location to increase the difficulty of suturing or closing the defect.

Referring back to FIG. 2A, a tumor 38 is located above the defect layer 42. The tumor 38 is preferably a different color from the base layer 40 or defect layer 42 or both such that it is readily identifiable by the trainee. Preferably, the tumor 38 is made of silicone or other polymer material and is red, black, blue or dark brown in color. In general, the tumor 38 is of a darker color than the base or defect layers 40, 42 or otherwise in contrast therewith when viewed through a scope. In one variation, the tumor 38 is connected to the defect layer 42 by adhesive or other means known to one of ordinary skill in the art. In another variation, the tumor 38 is not connected or attached to the defect layer 42 but is removably located thereon.

Figure 4:
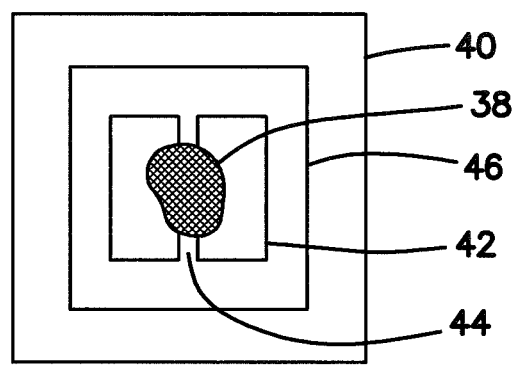
FIG. 4 illustrates a top view of a simulated tissue structure according to the present invention.

Still referencing FIG. 2A, the simulated tissue structure 20 includes a cover layer 46 located above the tumor 38. In one variation, the cover layer 46 overlays the tumor 38, defect layer 42 and the base layer 40. The cover layer 46 is preferably transparent or translucent in color and made of a polymer material such as silicone. In another variation, the cover layer 46 is the same color as the base layer 40 or defect layer 42. The cover layer 46 is at least as thick as the base layer 40 or defect layer 42 and in one variation is thinner than the defect layer 42 and in another variation is thinner than the base layer 40. The cover layer 46 is sized to cover the entire tumor 38 and defect layer 42 and is big enough to contact the base layer 40 in one variation. In another variation, the cover layer 46 is sized to cover the entire tumor 38 and contact the defect layer 40. The cover layer 46 is connected to the base layer 40, defect layer 42, tumor 38 or any more than one of the three layers by way of adhesive or other means known to one of ordinary skill in the art. In another variation, the cover layer 46 is smaller and connected to the defect layer 42 alone. In yet another variation, the cover layer 46 is connected to both the defect layer 42 and base layer 42 by adhesive or other means known to one of ordinary skill in the art. The cover layer 46 can be any shape or size and be configured to provide a smooth surface to the surgeon instead of a layered surface to the artificial tumor location. The cover layer 46, tumor 38, defect layer 42 or base layer 40 includes surface texturing in one variation. Also, the cover layer 46 assists in keeping the tumor 38 and defect layer 42 sandwiched between the cover layer 46 and base layer 40 which is advantageous in a variation wherein the tumor 38 is not adhered to the defect layer 42. A top planar view of the base layer 40, defect layer 42, cover layer 46 and tumor 38 is shown in FIG. 4. In one variation, any one or more of the base layer 40, defect layer 42 and cover layer 46 is formed of silicone molded over a woven, fabric, or mesh material such as nylon or cheesecloth so that the silicone layer has an integrated mesh structural support or other type of reinforcement. Any one or more of the layers 38, 40, 42, 46 can include a fabric or mesh reinforcement combined with an elastic polymer such silicone. The mesh support aids in preventing the suture, staple, or suture needle from tearing through at least one of layers and especially the defect layer 42 when the suture is pulled to close the gap 44.

Figure 2B:
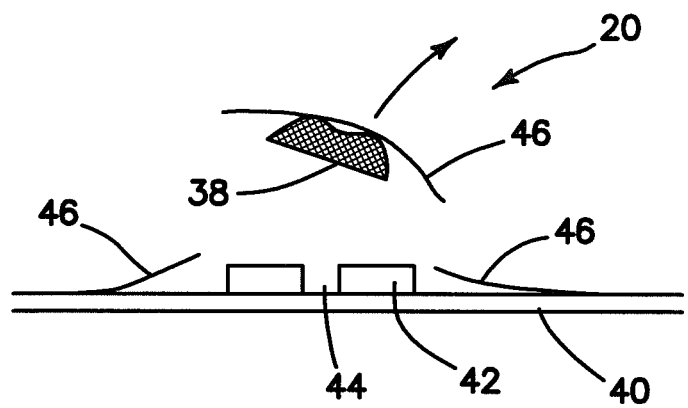
FIG. 2B illustrates a side cross-sectional view of a simulated tissue structure with tumor excised according to the present invention.
Figure 2C:
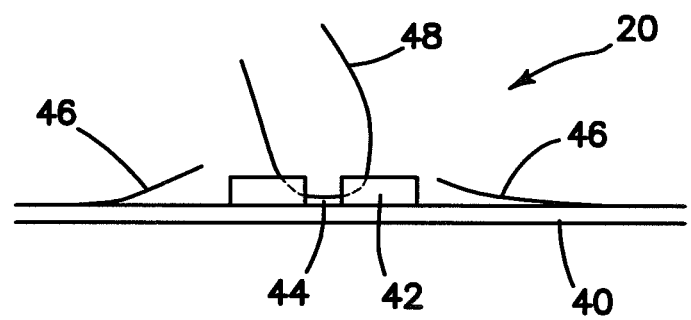
FIG. 2C illustrates a side cross-sectional view of a simulated tissue structure with an open suture according to the present invention.
Figure 2D:
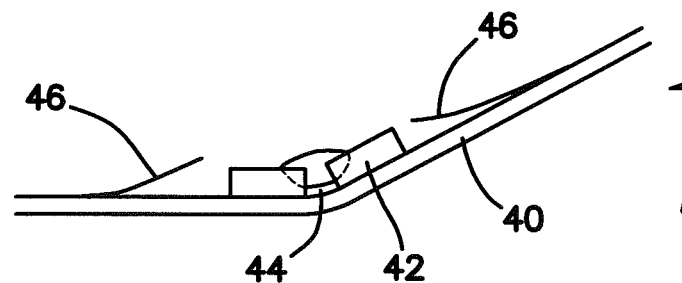
FIG. 2D illustrates a side cross-sectional view of a simulated tissue structure with a closed suture according to the present invention.

In FIG. 2B, the tumor 38 and a portion of the cover layer 46 are shown excised from the base layer 40. The excision is performed by the trainee using a surgical instrument such as a scalpel or other medical instrument to remove the tumor 38. The trainee will cut through the cover layer 46 around the tumor 38, isolate the tumor 38, lift and remove the tumor 38 away from the site to expose the underlying defect 44 as shown in FIG. 2B. Then, as shown in FIG. 2C the trainee sutures the defect 44 using a surgical suture 48 bringing the lips or edges of the defect layer 42 together as shown in FIG. 2D, thereby, practicing the closing of a gap or wound created by the surgical removal of a tumor 38. Cutting the at least one layer to create an opening and removing the artificial tumor and suturing the gap is performed while the simulated tissue structure is disposed inside a simulated body cavity 18 of a surgical training device such that the simulated tissue structure is at least partially obscured from view by the user.

Figure 5:
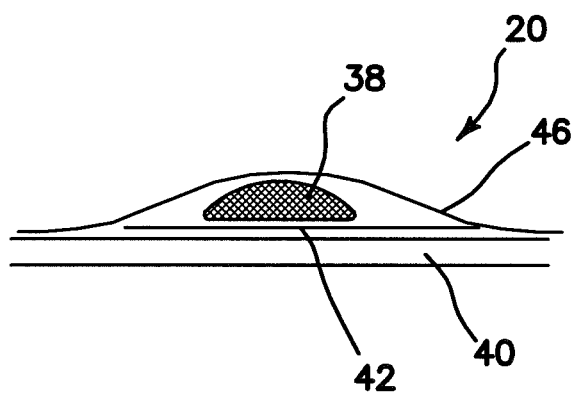
FIG. 5 illustrates a side cross-sectional view of a simulated tissue structure according to the present invention.

Turning now to FIG. 5, there is shown another variation in which there is no pre-formed gap or defect in the second or defect layer 42. Instead, upon excising the tumor 38, the defect is created by the user in one or more of the cover layer 46, defect layer 42, base layer 40 and any remaining tumor portion not removed by the user. The user would then practice suturing the created defect in any of these layers 38, 40, 42, 46. In one such variation, one of the defect layer 42 or base layer 40 is omitted from the construct. In another variation, the tumor 38 is located on a base layer 40 and the defect layer 42 is placed over the tumor 38 such that the defect layer 42 is above the tumor 38. In such a variation, a cover layer 46 may or may not be included. If a cover layer 46 is included it may be integrally formed together with the defect layer as a separate unitary layer. In any of the constructs described above with respect to FIGS. 2-5, the constructs may be flipped upside down or otherwise the layers placed in reverse or otherwise the construct being approachable by the user from either the top or bottom direction with the thicknesses and colors of the layers being adjusted accordingly if necessary to provide the simulated effects of real tissue.

Figure 6A:
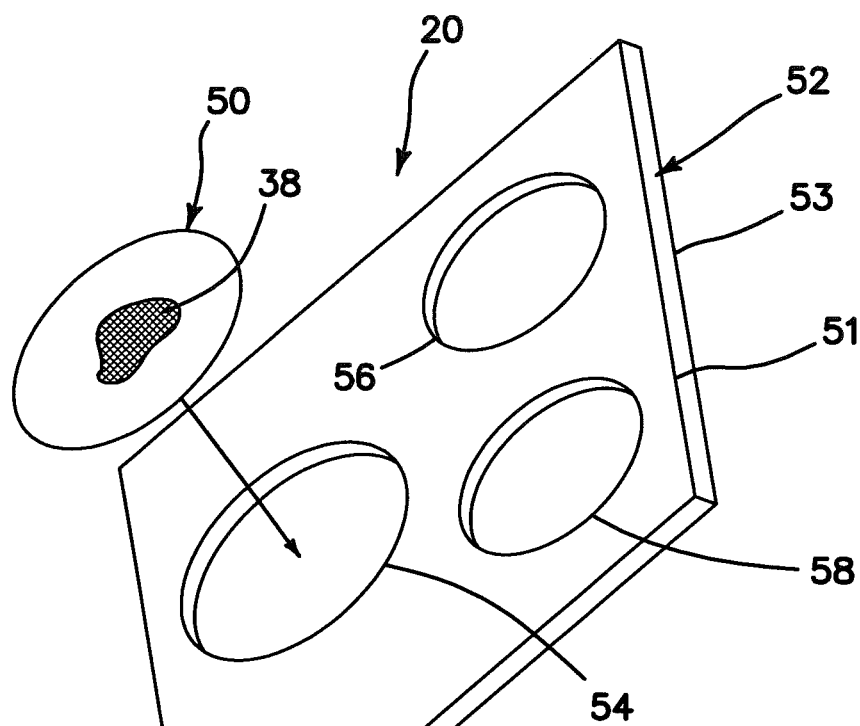
FIG. 6A illustrates a perspective view of a modular tissue structure and support according to the present invention.
Figure 6B:
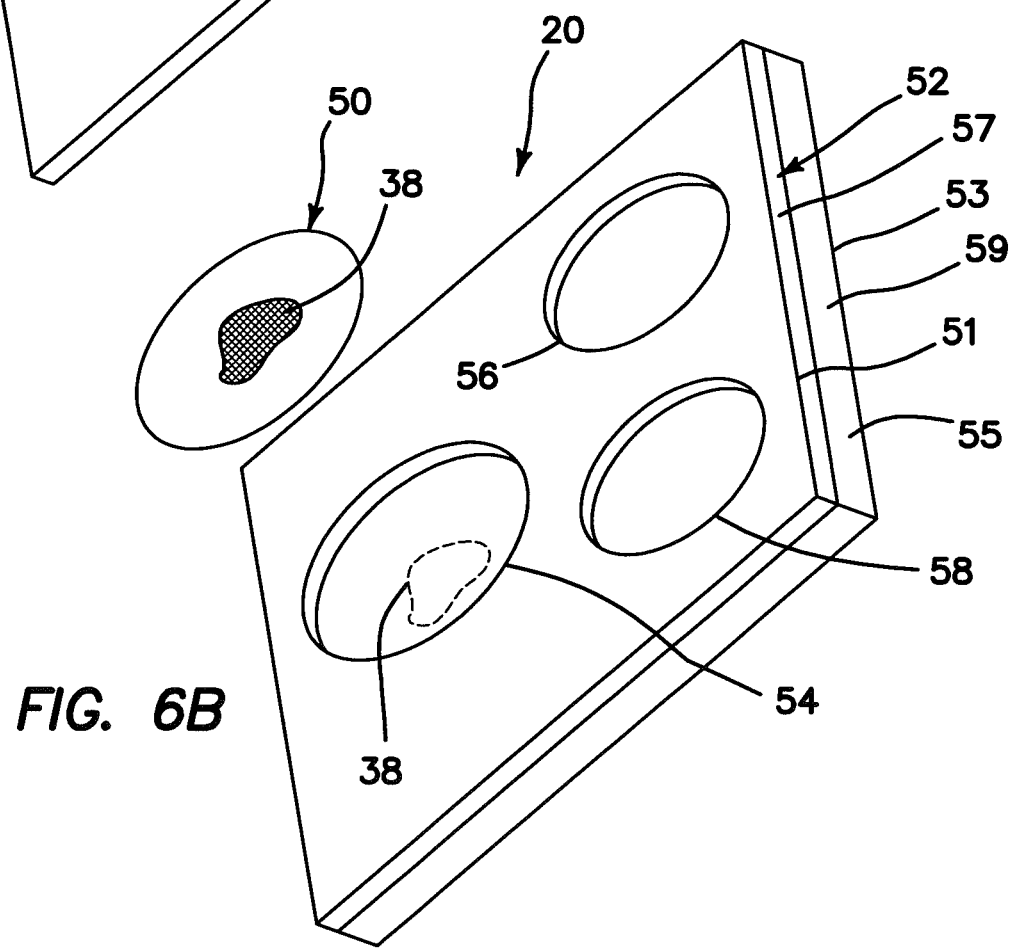
FIG. 6B illustrates a perspective view of a modular tissue structure and support according to the present invention.

Turning now to FIGS. 6A and 6B, in any of the variations in this description, the simulated tissue construct can be modular such that it is not integrally formed with the entire simulated organ 20 but instead configured as a module 50 that is removable and interchangeable. One or more modules 50 are supported or contained in a module support 52. A module support 52 includes a first surface 51, a second surface 53 and one or more tumor module receiving portions 54, 56, 58 formed in the support 52. The tumor support 52 can be rigid or pliable and made of polymeric material. The tumor support 52 may also comprise a sheet of elastomeric material. The module receiving portions 54, 56, 58 are each sized and configured to receive a correspondingly sized and configured module 50. The modules 50 and module receiving portions 54, 56, 58 in FIG. 6 are shown to be circular; however, the tumor module 50 can be any shape with a complementary shaped receiving portion formed in the module support 52. The thickness of the support 52 can vary providing the construct with varying depths of tumor module 50 positioning. The module receiving portions 54, 56, 58 may include bottom walls onto which the tumor modules 50 may rest. Alternatively, the tumor receiving portions 54, 56, 58 extend between openings in the first surface 51 and the second surface 53 with the modules 50 with tumor 38 being connected between or at one of the openings at either surface 51, 53 or suspended within the tumor receiving portion. In one variation, a single tumor module 50 includes one or more tumors 38. The module support 52 is loaded with one or more tumor modules 50 and the simulated tissue construct 20 is inserted into the body cavity 18 of the surgical training device 10, framework or other torso model. It can be placed on the base 12 of the training device 10 or suspended within the body cavity 18 of the training device 10. The simulated tissue construct 20 and/or training device is fashioned with attachment mechanisms such as clips, fasteners, wires, hook-and-loop type fasteners and the like for placement, suspension or connection of the simulated tissue construct 20 to a training device 10.

With particular reference to FIG. 6B, there is shown a module support 52 that includes more than one layer. The module support 52 of FIG. 6B includes a first layer 57 connected to a second layer 55. In one variation, the first layer 57 is made of a sheet of elastomeric material and the second layer 55 is made of any suitable polymeric material such as low-density elastomeric foam. The second layer 55 serves as a support for the first layer 57. The second layer 55 also advantageously provides depth to the module support 52 permitting the tumors 38 within the modules 50 to be placed deeply into the module support 52 relative to the first surface 51. Module receiving portions 54, 56, 58 are formed in one or more than one of the first layer 57 and the second layer 55. Module receiving portions 54, 56, 58 formed in the second layer 55 may have a different shape than the shape the same module receiving portion 54, 56, 58 has in the first layer 57. In one variation, the tumor module 50 comprises at least only the simulated tumor 38 which is embedded or buried inside the second layer 55 with at least one of the first layer 57 or second layer 55 constituting a defect layer which the user can practice closing. As an alternative, the first layer 57 does not include a module receiving portion but instead the first layer 57 serves as a cover layer which the user practices cutting through to access the tumor 38 located in a tumor receiving portion formed in the second layer 55. In such variation, the first layer 57 can be a sheet of elastomeric material such as silicone and the second layer 55 is a layer of low-density elastomeric foam. The module support 52 is planar as shown in FIGS. 6A and 6B or, alternatively, shaped to mimic a portion of the human anatomy, tissue or organ.

Figure 7:
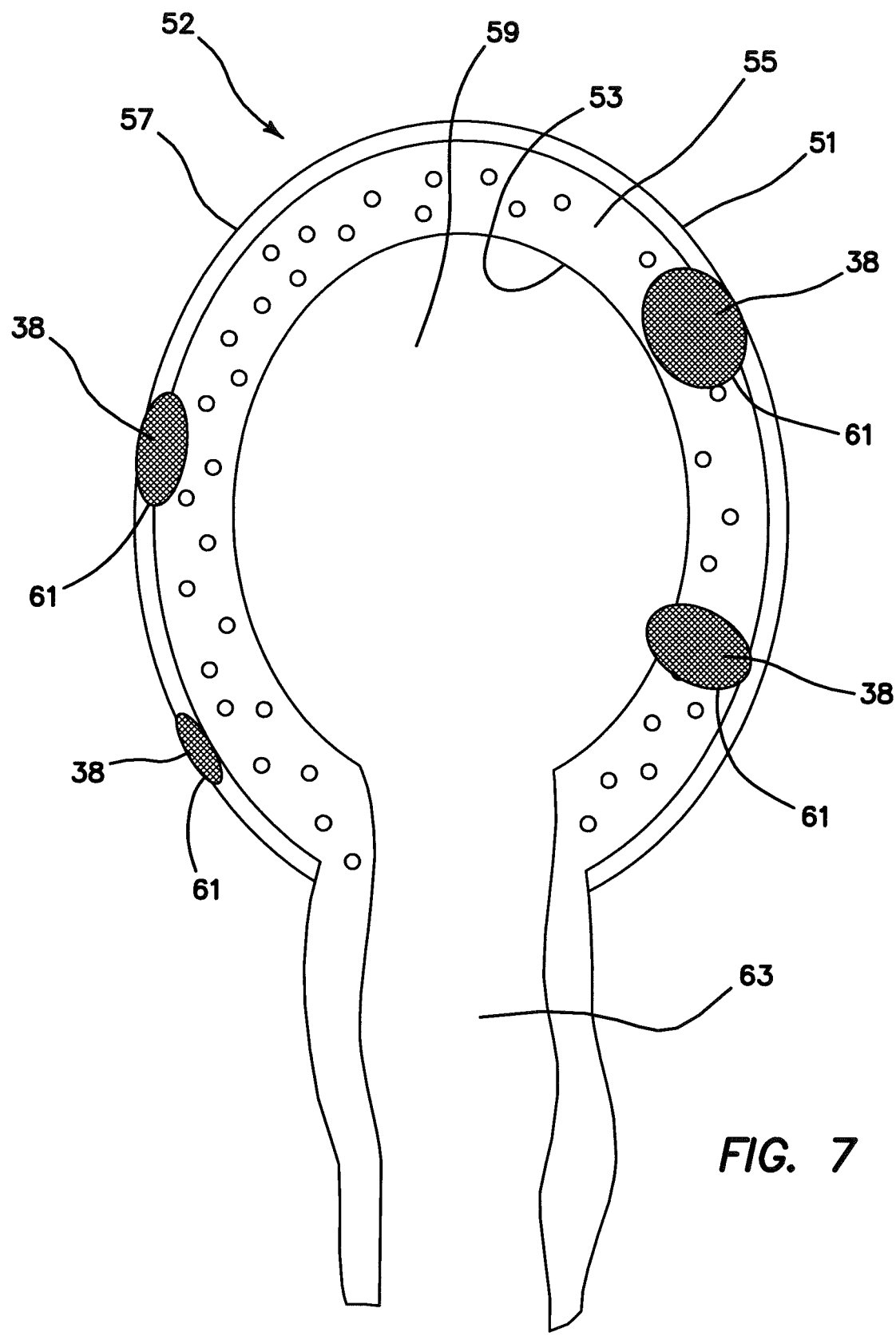
FIG. 7 illustrates a cross-sectional view of a simulated tissue structure configured to mimic a human uterus according to the present invention.

For example, FIG. 7 illustrates a support 52 that is shaped to mimic a human uterus. The support 52 includes a first layer 57 connected to a second layer 55. In one variation, the first layer 57 is made of any suitable polymeric material such as a sheet of elastomeric material and the second layer 55 is made of any suitable polymeric material such as low-density elastomeric foam. The second layer 55 serves as a support for the first layer 57 and advantageously permits the tumors 38 within the modules 50 or the tumors 38 by themselves to be connected to the support 52 and realistically extend deeply into the support 52 and be dispersed throughout the support 52 in various locations and orientations including being embedded into the first layer 57 as shown in FIG. 7. Tumor or module receiving portions 61 are formed in at least one of the first layer 57 and second layer 55. The tumor receiving portions 61 may be pockets that are preformed in the second layer 55 or can be formed by the user by cutting slits into the second layer 55. In one variation, the tumors 38 are configured to mimic fibroid tumors commonly found in the human uterus. Examples of fibroid tumors that are simulated by the tumors 38 disposed in the support include but are not limited to one or more of the following types of fibroids: pedunculated submucosal fibroids, subserosal fibroids, submucosal fibroids, pedunculated subserosal fibroids and intramural fibroids. The user can approach the support 52 to excise the simulated tumors 38 from the first surface 51 or the second surface 53 via the access channel or opening 63. In one variation, the opening 63 serves as the only opening to the hollow portion 59 or alternatively the support 52 can have a substantially C-shaped planar configuration with access available to the user from above or below the planar C-shaped structure.

In one variation, the module support 52 in any of the variations is not planar but is provided with a landscape that includes curves and other structures, mountains and valleys and various textures. The varying landscape provides the user with various levels of difficulty in approaching each tumor location requiring the user to navigate around artifacts and features that may obscure the tumor location. These structural artifacts in the tumor support 52 may be integrally formed with the tumor support 52 or also be modular in structure similar to the tumor modules 50 making the anatomy landscape modules removable and interchangeable. Tumor modules 50 are interchangeable with non-tumor modules that include, for example, features and artifacts or textures made of silicone or other material extending outwardly or inwardly from the one or more of the upper and lower surfaces 51, 53 of the module support 52. The features in such non-tumor modules can have various shapes to mimic anatomy that includes adjacent organ structures or tissues. For example, a non-tumor module can include a tubular form of silicone to mimic an intestine. The non-tumor and tumor modules 50 are removably connected to the module support 52 by any means known to one skilled in the art enabling the user to discard a module after use and then to continue practicing by replacing the discarded module or moving to an adjacent module 50 in the module support 52 or changing out a tumor module 50 for another tumor module 50 having a different feature or level of difficulty.

Figure 8:
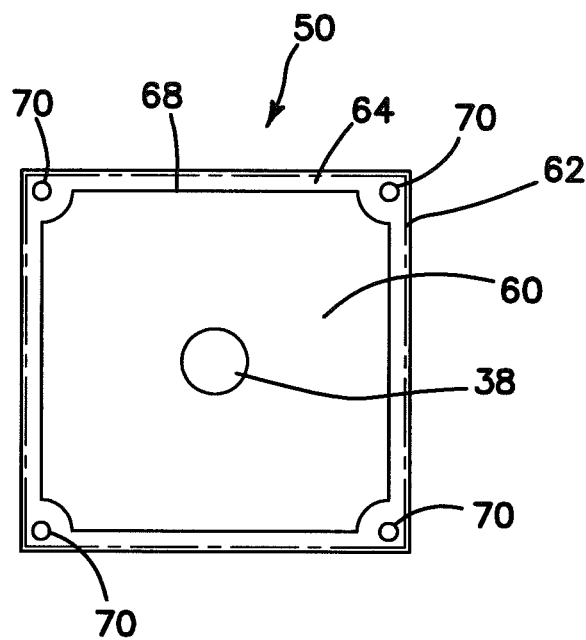
FIG. 8 illustrates a top view of a modular tissue structure according to the present invention.
Figure 9:
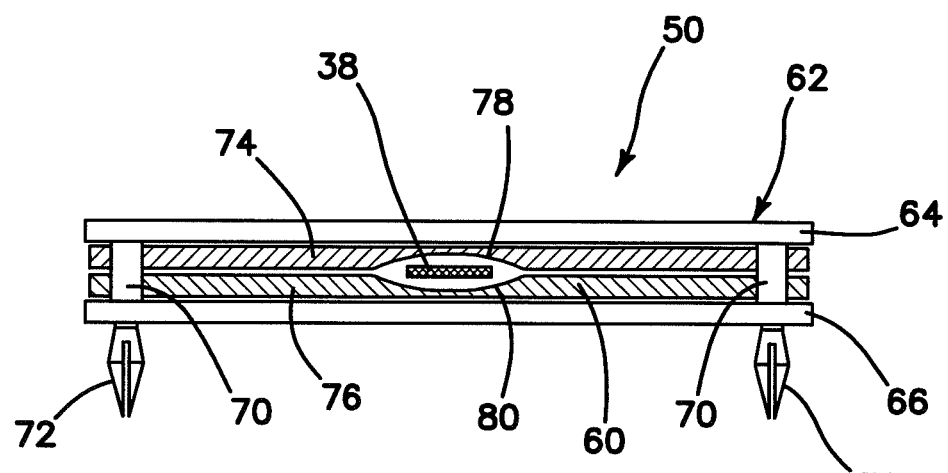
FIG. 9 illustrates a side view of a modular tissue structure according to the present invention.

A variation of the tumor module 50 is shown in FIGS. 8 and 9. The tumor module 50 includes a simulated tissue portion 60 connected to a support 62. In the variation shown, the support 62 includes a top frame 64 connected to a bottom frame 66. At least one of the top frame 64 and bottom frame 66 includes a window. The top frame 64 having a window 68 is shown in FIG. 8. The bottom frame 66 may or may not include a window. If windows are provided in both the top frame 64 and the bottom frame 66, the windows are aligned at least in part. The support 62 is sized and configured to receive a simulated tissue portion 60 between the top frame 64 and the bottom frame 66. The top frame 64 is connectable to the bottom frame 66 to capture the unitary simulated tissue portion 60 or a simulated tissue portion 60 formed from multiple layers and, in one variation, separable. In one variation, the frames 64, 66 are spaced apart from each other using spacers 70. Furthermore, at least one of the top and bottom frames 64, 66 includes one or more connecting features 72 configured to secure the tumor module 50 to a tumor support 52 (not shown). In FIG. 9, the connecting features 72 are shown as extending pegs for insertion into corresponding holes formed in the tumor support 52 to provide a snap-fit engagement. A friction fit or other fasteners or connecting means such as hook-and-loop type materials can be employed on the module 50 and module support 52 to connect the module 50 to the support 52 in a removable fashion.

Still referencing FIGS. 8 and 9, the simulated tissue portion 60 can be any of the constructs described above with reference to FIGS. 2-5. With windows formed in both the first and second frames 64, 66, the simulated tissue portion 60 can be approached from either side of the module 50. Any layer described above as a cover layer may act as a top layer or as a bottom layer depending on from which side or direction the simulated tissue portion 60 is approached. For example, a base layer may also serve as a top layer or as a bottom layer depending on which side or direction the simulated tissue portion 60 is approached. In such bidirectional constructs, the thicknesses and colors of the layers may be adjusted accordingly to provide the desired simulated effect.

The simulated tissue portion 60 in FIG. 9 includes a first layer 74 and a second layer 76. The first and second layers 74, 76 are made from a polymeric material configured to mimic real live tissue such as silicone or other polymer and can include dye of any one or more appropriate colors or mesh, fabric, or other reinforcement. Each of the layers 74, 76 includes a tumor-receiving portion 78, 80, respectively. Each tumor-receiving portion 78, 80 is a concavity, indent, half-pocket or a location of reduced layer thickness that is formed in the layers 74, 76. The tumor-receiving portions 78, 80 are substantially aligned to form a pocket for the tumor 38. Although each layer 74, 76 in FIG. 9 is shown with a tumor-receiving portion 78, 80, a single tumor-receiving portion is formed in at least one of the first and second layers 74, 76 in one variation. A tumor 38 is disposed within the pocket formed by one or more tumor-receiving portions 78, 80 formed in the one or more layers 74, 76. The tumor 38 may be adhered to either layer 74, 76 or free-floating inside the pocket. As shown in FIG. 9, the tumor-receiving portion formed in a layer can be considered to be one type of defect and the variation of FIG. 9 describes a simulated tissue construct comprising two defect layers with a tumor therebetween. As a user approaches the simulated tissue portion 60, the user will see the target tumor location. Visualization of the target tumor 38 is enhanced by the tumor-receiving portion being thinner in thickness relative to the rest of the layer with the thinning of the layer being provided by the concavity or pocket. The user will then cut in the general location of the tumor cutting into at least one of the layers 74, 76 to remove the tumor 38. Cutting through one or more layers completes the creation of a gap or full defect, which the user can then practice suturing or otherwise closing together. In another variation, there is no tumor-receiving portion formed in the layers 74, 76. In such a variation, at least one tumor is disposed between the two layers 74, 76 wherein the layers 74, 76 have a substantially uniform thickness with the tumor 38 creating a minor bulge in the layers.

Figure 10A:
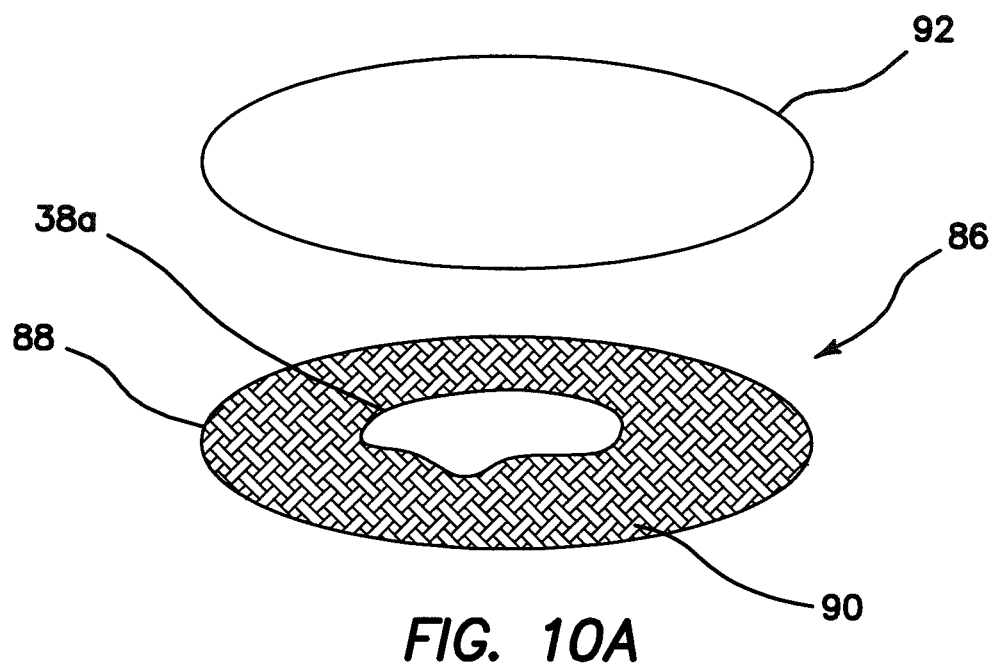
FIG. 10A illustrates a perspective view of a simulated tissue structure according to the present invention.
Figure 10B:
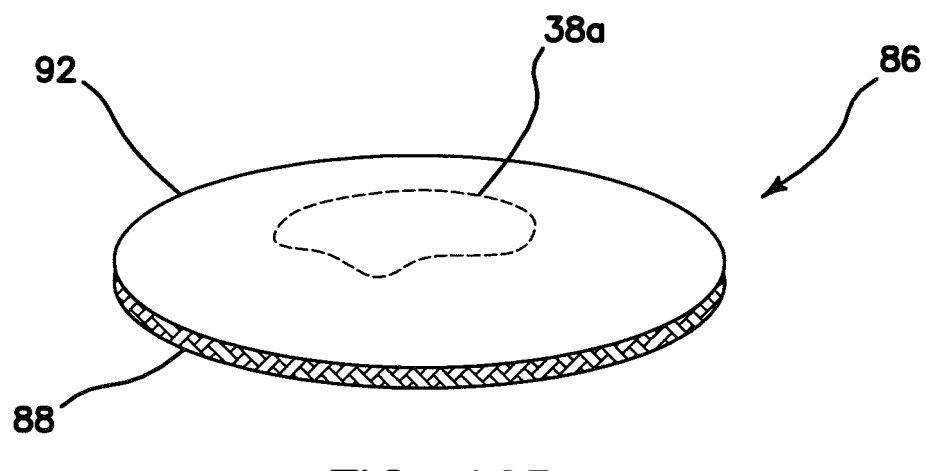
FIG. 10B illustrates a perspective view of a simulated tissue structure according to the present invention.
Figure 11A:
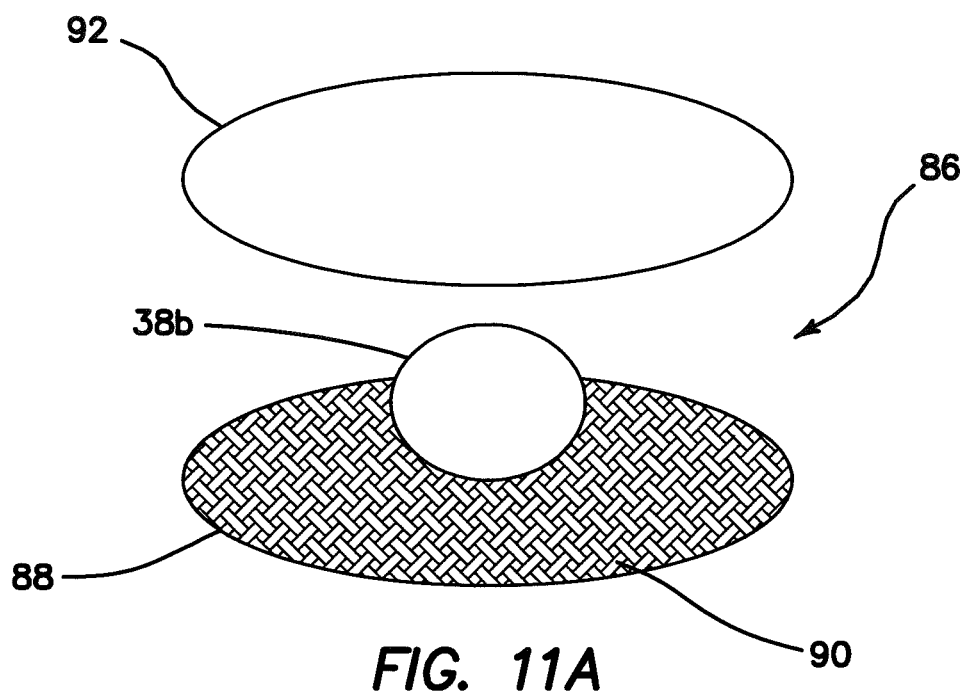
FIG. 11A illustrates a perspective view of a simulated tissue structure according to the present invention.
Figure 11B:
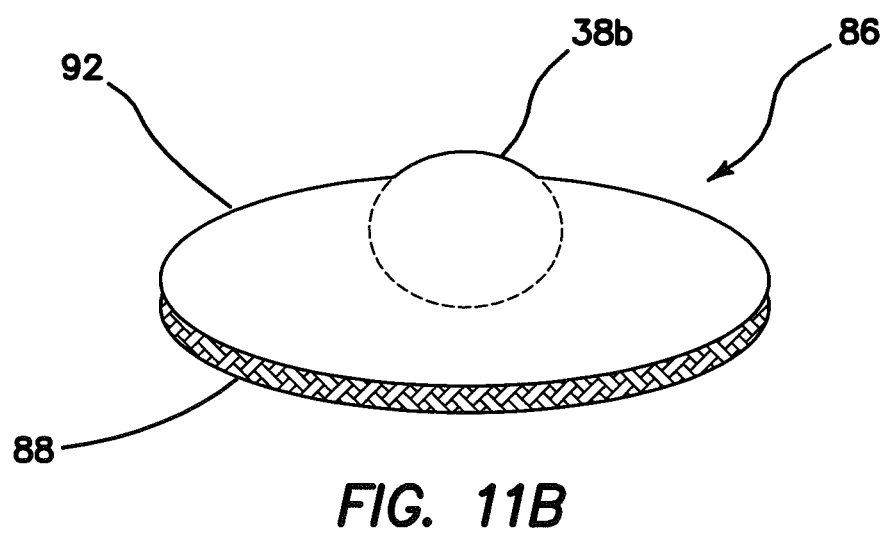
FIG. 11B illustrates a perspective view of a simulated tissue structure according to the present invention.
Figure 12:
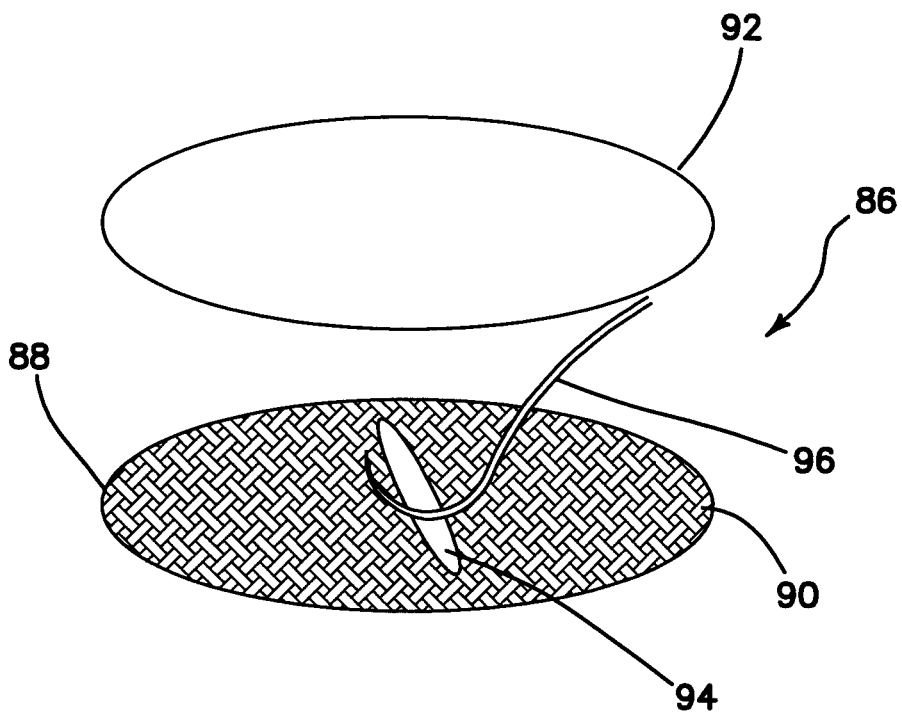
FIG. 12 illustrates a perspective view of a suture needle and a simulated tissue structure according to the present invention.

Turning now to FIGS. 10A, 10B, 11A, 11B and 12, there is shown another variation of a simulated tissue portion 86. The tissue portion 86 can be integral or modular as described above. The tissue portion 86 includes a base layer 88 formed of any suitable polymeric material such as silicone or other elastomeric polymer that may or may not include a reinforcement material such as fabric, mesh, nylon or other reinforcement material or filler that will resist tearing while carrying sutures or while being sutured. The base layer 88 is connected to a defect layer 90 that is overlaid onto the base layer 88. The defect layer 90 includes a plurality of protrusions extending upwardly from the base layer 88. The defect layer 90 may be integrally formed with the base layer 88 or be a separate layer that is adhered to the base layer 88. As can be seen in FIGS. 10A, 11A and 12, the defect layer 90 is configured into a lattice shaped pattern such that the lattice is raised above the base layer 88 or projects upwardly from the base layer 88. A lattice pattern is exemplary and any shape may be formed by the defect layer 90 such that it contains a plurality of adjacent projections. These projections of the base layer 90 provide the user with locations to hook a suture needle into and as a platform to raise the tumor 38a, 38b above the base layer 88 for easy excision. The tumors 38a, 38b may be adhered to the defect layer 90 and a cover layer 92 may be included in one variation. FIGS. 10A and 11A show the base layer 88, defect layer 90, tumors 38a, 38b and a cover layer 92 in a semi-exploded view of the simulated tissue portion 86 wherein the cover layer 92 is raised above the other layers. The tumor 38a of FIG. 10a is substantially planar and is shown covered in FIG. 10B by the cover layer 92. Tumor 38b of FIG. 11A has greater height and is substantially spherical in shape and FIG. 11B shows the spherical tumor 38b covered with the cover layer 92 leaving a raised portion or protuberance in the construct. FIG. 12 shows the tumor 38 being removed leaving a remnant defect 94 in the base layer 88 and a suture needle crossing the gap in the defect 94 with the defect having been accessed under or through the cover layer 92.

Synthetic materials that mimic the characteristics of living tissue may include silicone elastomers, natural latex, polyurethane elastomers, hydrogels and styrenic-block-copolymers. Generally, the elastomeric materials are dielectric unless specially treated. An elastomer is generally any of various polymers with elastic properties resembling those of natural rubber. A hydrogel is generally a hydrophilic polymer containing between 50% and 99% water. A thermoplastic generally pertains to materials that may be repeatedly made soft and hard by heating and cooling. Thermoplastics are non-conductive and are suitable for making the tray or base, bone and other similar structures. A thermoset generally pertains to elastomeric materials that permanently harden or solidify upon being heated or cured. Thermoset plastics are non-conductive such as silicone and polyester and are suitable for forming pathologies, tumors and the like. Silicone elastomers are usually very soft, stable and non-conductive and therefore suitable for forming artificial organs such as the liver, kidney, spleen, ovaries, gallbladder, stomach, major arteries, colon, intestine, major veins, omentum, mesentery, pathologies and other anatomy. Natural latex is very resilient and non-conductive and suitable for forming artificial muscle, cartilage and the like. Polyurethane elastomers and foams are non-conductive and suitable for filling hollow structures, bone and the like. Hydrogels SBCs may be conductive and are good for any soft structure to be operated upon by electrosurgery.

In one variation, a surgical simulation tray, that is insertable into a lap trainer 10 for practicing surgical techniques including laparoscopic and electro-surgical methods, comprises a base, an arrangement of anatomical organs, and a covering layer. The base comprises a rigid or semi-rigid structure that is sized and configured to fit within or upon a surgical training device 10. The base is additionally supplied with anatomical support features or receptacle portions formed by upstanding walls that cooperate and conform in size and shape with the placement of body organs within the receptacle portion or upon the base. Body organs, made of elastomeric materials, are placed strategically within or upon the base according to the specific needs of the training device and/or according to the target anatomy. At least one covering layer may be placed over the entire assembly or upon specific areas thereof. The covering layer is sized and configured to represent one or more of the omentum, mesentery, fat, connective tissue, peritoneum, mesothelium, broad ligaments or the like. The covering layer may comprise silicone elastomer, which is non-conductive. The non-conductive covering layer is suitable if no electrosurgical activity is used on the covering layer. If electrosurgical activity is contemplated, the covering layer is comprised of a conductive gel such as a hydrogel. A combination of conductive and non-conductive layers is provided when electrosurgery is directed to one of the layers.

In addition to the organs placed within or upon the base, there may be a plurality of pathologies or defects also placed strategically relative to the organs or within the simulated organs themselves. The pathologies or defects may represent tumors, cysts, ectopic pregnancies or the like. For instance, a uterus may be formed having an outer layer of silicone rubber and a substantially hollow inner layer of soft polyurethane foam as described above with respect to FIG. 7. At various locations between the silicone layer and the foam layer, synthetic fibroid tumors may be placed for identification and removal by a surgical trainee. One simulated construction of a synthetic fibroid tumor comprises a small quantity of very soft uncured silicone rubber. The uncured silicone rubber is mixed with a quantity of amorphous, untreated fumed silicon dioxide, which acts as a filler and flow controller. The combination of the uncured silicone rubber and the silicon dioxide is shaped and allowed to cure. When fully cured, this combination results in an irregularly shaped, somewhat fibrous structure that resembles a human fibroid tumor. This construction of a simulated human fibroid tumor is then placed into a simulated organ model such as that of a uterus. This tumor simulation is not limited for use to mimic a tumor in a gynecological model, but also can be used in other organ models that include tumors for practicing their removal. This tumor simulation comprising the cured mixture of silicone rubber and silicon dioxide strikingly resembles real-life tumors that are found in a gynecological surgical situation and provides an amorphous and realistic look and feel when practicing surgical techniques. Dark colored dye such as red or black may be added to the mixture before curing and mixed throughout. This construction may also be used to construct simulated ectopic pregnancies for insertion into a simulated fallopian tube of a simulated organ placed within the training device 10. The mixed consistency of the silicone and filler, being very dry and shape-able, advantageously allows the tumors or other pathologies to be formed very creatively, easily and at any size to mimic actual physical conditions. Tumors made of silicone and filler are non-conductive and may be fractured or torn if not properly handled.

A few examples of organ simulation models that include the combination of conductive and non-conductive portions will now be discussed. In the surgical procedure of a liver resection, a simulated organ model tray for training electrosurgical procedures will have a conductive hydrogel liver, cystic duct and mesentery. These conductive portions of the model are located adjacent to non-conductive portions of the anatomy comprising the same organ or different organs. For example, for practicing the surgical procedure of a cholecystectomy, the organ model includes a cystic duct and mesothelium made from electro-conductive hydrogel and the liver and gallbladder are non-conductive. For practicing a sleeve gastrectomy, the simulated organ model includes one or more of the blood vessels and the greater omentum/ mesentery along the greater curvature of the stomach made of electro-conductive hydrogel material and one or more of the stomach, large intestine, and small intestine made of non-conductive material. For practicing a gastric bypass, the simulated organ model includes one or more of the short gastric vessels and the mesentery/omentum along the greater curvature of the stomach made of electro-conductive hydrogel material and the stomach made of non-conductive material. In one variation, at least a portion of the jejunum and/or stomach is made of electro-conductive hydrogel. For practicing ovarian procedures such as the removal of fibroid tumors, treatment of ectopic pregnancy, ovarian cysts, and hysterectomy, the training model includes both conductive and non-conductive materials. For example, the organ model may include one or more simulated fallopian tubes, round ligament, ovarian ligament, IP ligament, broad ligament, bladder flap, uterine artery/vein, cardinal ligament, uterosacral ligament, made of electro-conductive hydrogel and one or more of the uterus, ovaries, rectum, urinary bladder, ureters and kidneys are non-conductive. In one variation, the location just above the cervix and/or just below the cervix is made of electro-conductive hydrogel for practicing a supracervical or total colpotomy. Procedures that involve the colon, small intestine, sigmoid or rectum may also require that specific portions be electrically conductive. These conductive portions are located adjacent to non-conductive portions. For example, to practice transanal minimally invasive surgery for the local excision of tumors, the organ model would include a colon and/or rectum, and tumor made of non-conductive elastomeric material except for the area surrounding the tumor which would be made of electro-conductive hydrogel material. In another variation, at least a portion of the rectum is made of electro-conductive hydrogel such as for the practice of transanal total mesorectal excision. In the practice of an appendectomy, the simulated organ model may include one or more of the mesentery/ mesoappendix, appendiceal artery and blood vessels made of electro-conductive hydrogel and one or more of the appendix, cecum and terminal ileum made of non-conductive elastomeric material. For practicing a colectomy, the simulated organ model may include one or more of the mesentery, ileocolic artery, middle colic artery, right colic artery, inferior mesenteric artery, inferior mesenteric vein, left colic artery, sigmoid arteries, rectal arteries, marginal arteries, corresponding veins, omentum, white line of Toldt, mesenteric attachments to the retroperitoneum, and mesorectum made of electro-conductive hydrogel and one or more of the colon, liver, spleen, stomach, kidney, duodenum, retroperitoneum made of non-conductive material. Hydrogel material must be hydrated in order to be sufficiently conductive and therefore it may be difficult to maintain a long shelf-life.

With reference to the covering layer, in one variation, the covering layer comprises a thin semi-transparent sheet of silicone rubber that is calendared or press-formed so as to have a texture and finish that appears to be naturally occurring. An alternate variation of the covering layer may further comprise a thin semi-transparent sheet of hydrogel material that is cured from slurry and allowed to develop surface features as it cures. The hydrogel material, when hydrated becomes conductive and allows the use of electrosurgical devices. A composite structure for the covering layer comprises a conductive gel layer sandwiched between two silicone elastomer non-conductive layers. In such a case, one or more of the outer non-conductive layers are removed to expose the conductive gel layer. The non-conductive silicone layers advantageously provide a sealing for the hydrogel layer retaining the fluid content of the conductive gel.

In another variation of the covering layer, a thin film of two-part platinum or tin cured liquid silicone, thoroughly mixed, is placed upon a sheet of textured polyethylene foam. A notched trowel or spreader is then used to spread the silicone material over the surface of the first layer of foam leaving an irregular pattern of material thickness. A second layer of textured polyethylene foam is placed over the first layer of foam leaving the silicone between. A textured roller or stamping device is then moved over the surface of the second layer of foam to calendar the silicone material between the foam layers. The resulting silicone sheet, when cured, is non-tacky and exhibits the characteristics of omentum, mesentery, fat etc. The sheet advantageously has strong and weak regions that can be used to demonstrate the use of mechanical dissecting instruments and scissors.

Figure 13:
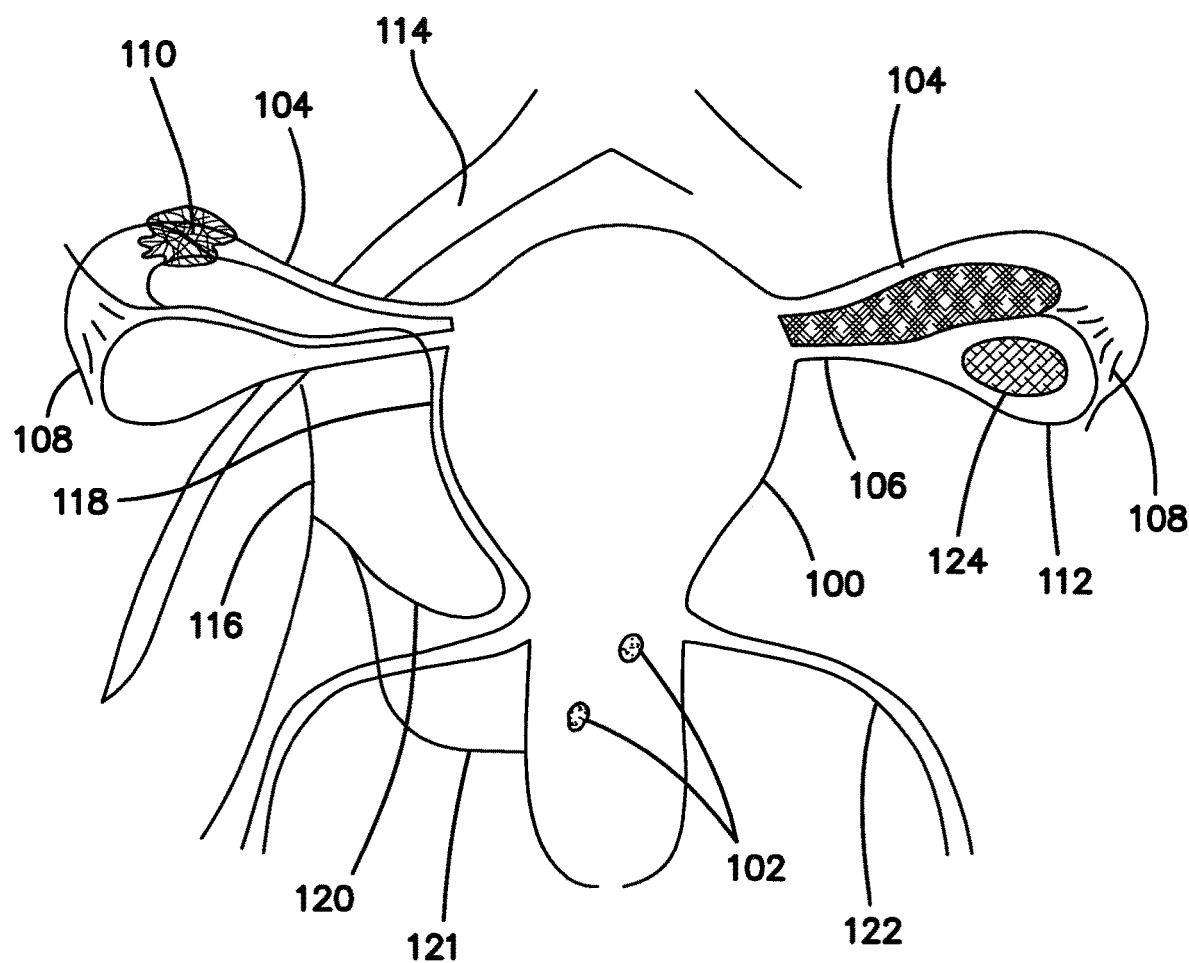
FIG. 13 illustrates a schematic of a model of female uterine anatomy with tumor placement according to the present invention.

The specific organs that may be used in a surgical simulation device include a uterus 100 as shown in FIG. 13. The uterus comprises an outer shell constructed of soft silicone rubber molded over a uterine form. When the shell is fully cured, it is placed over a molded foam rubber uterine form that is substantially hollow, having about a 7 to 9 millimeter thick wall. Various pathologies may be placed between the silicone shell and the foam wall. Some pathologies may be inserted into the foam wall to mimic intramural tumors, fibroid tumors 102 or cysts. Fallopian tubes 104, ovarian ligaments 106 and other attendant structures may be inserted into the silicone/foam structure and attached with adhesive. Ovarian cysts 124 may also be provided and made of the same tumor material. Attendant structures may include the aorta 114, the internal iliac artery 116, the ovarian artery 118, the uterine artery 120, the vaginal artery 121, and the uterosacral ligament 122. The uterine shell is the primary portion to be operated upon. In one variation, it is constructed of silicone elastomer and therefore suitable if the uterine model is intended to be cut or incised in training. If electrosurgery is being practiced upon the uterine model, a uterine model is selected that comprises conductive gel. Connecting structures and tubes are constructed of silicone elastomer or conductive gel depending on the surgical modality.

Fallopian tubes 104 constructed of two-part platinum or tin cured silicone comprising a first open end and a second open end and a through lumen. The first open end forms a tubular structure that extends a distance of about 20 centimeters and has a diameter of about 6.5 millimeters and a very thin wall of approximately 1-1.5 millimeters. Toward the end of the tubular structure, a bulbous portion is formed having a diameter of about 1.5 centimeters and a length of about 3 centimeters. The bulbous portion transitions to a narrowing of the tubular structure to about 7 millimeters. The narrowed tubular structure then gradually enlarges into a funnel shaped structure having a final open diameter of about 2 centimeters over a length of about 3.5 centimeters. Before the fallopian tube 104 is removed from the form upon which it is made, a plurality of axial cuts 108 is made at the second enlarged open end. When removed from the form, these cuts allow the silicone material to move in a way that resembles human fimbria. Pathology such as an ectopic pregnancy 110 may be inserted into the bulbous portion of the fallopian tube 104 for identification or excision. In addition, to maintain the shape of the thin walled conduit portion of the fallopian tube when folded, a length of soft fibrous yarn, such as used in knitting, may be placed within the lumen.

In the simulated uterine model, the ovaries 112 are hollow bulbous structures formed from two-part platinum or tin cured silicone. A soft polyurethane foam support is placed within the ovarian structure. The polyurethane support is sized and configured to fit neatly within the ovarian shell and have a nest or receptacle for pathology such as an ovarian cyst 124. The trainee may cut through the ovarian wall and into the polyurethane foam to remove the pathology and subsequently suture the defect to close. Ovaries are made of non-conductive material and are cut with scissors or scalpel. In another variation, the ovaries are made of conductive gel so they could be cut with electrosurgery. The cyst is made of non-conductive material.

In another simulated organ model, a stomach comprises a hollow stomach-shaped bladder having a first open end, a second open end and an enlarged central portion. The enlarged central portion is divided by a pathway that extends from near the first open end to near the second open end. The pathway comprises a region of silicone adhesive placed strategically along a desired trajectory adjacent to the lesser curvature of the stomach. The opposing walls of the stomach bladder are approximated and held together by the adhesive. The stomach may be divided along the adhesive pathway to simulate a particular procedure. That is, the adhesive pathway directs the trainee to staple or cut along a preferred surgical pathway. The adhesive simulates the condition in which several rows of staples would be placed before the cutting element in a surgical stapler is deployed. As a result, the dissected stomach portion appears to be stapled securely and the residual stomach portion is gas tight and secure. In another variation, the adhered portion of the stomach is formed of conductive gel material adjacent to non-conductive adjacent portions of the stomach. In yet another variation, the predetermined surgical pathway across the stomach or other organ is constructed of conductive gel material adjacent to non-conductive material of the same organ or adjacent to non-conductive material of different organs and anatomical structures.

In another simulated organ model, a liver constructed of hydrogel may be placed into the training module 10 where the procedure would involve electrosurgical dissection. In one variation, the base or tray of the training module 10 receives and holds in place either a silicone liver or a hydrogel liver. A receiving feature may comprise a nest, pocket or receptacle sized and configured to maintain in position a silicone or hydrogel or foam rubber liver depending on the needs of the particular training module. If a procedure required electrosurgical activity, such as a liver resection, the liver is made of conductive gel. The base or tray is configured to accept a liver made of gel, silicone or foam depending on the specific procedure. If the procedure to be practiced does not involve electrosurgery, it is far more economical to use a silicone or foam model.

While certain embodiments have been particularly shown and described with reference to exemplary embodiments thereof, it will be understood by those of ordinary skill in the art that various changes in form and details may be made therein without departing from the spirit and scope thereof as defined by the following claims.

We claim:

1. A surgical simulation system for the practice of electrosurgical activity, comprising:
at least one outer layer;
a simulated tissue structure comprising an inner layer that is adjacent to and in contact with the at least one outer layer, wherein the inner layer comprises a foam material, wherein the inner layer defines an interior cavity, and wherein both the inner layer and the at least one outer layer define a shape of at least a portion of a uterus; and
a simulated pathology located adjacent to or embedded in the simulated tissue structure, wherein the simulated pathology is removable from the simulated tissue structure via use of an electrical current,
wherein, the at least one outer layer is placed over the simulated tissue structure, wherein the at least one outer layer comprises an elastomeric hydrogel, the elastomeric hydrogel being electro-conductive such that the at least one outer layer is operably severable under application of the electrical current to simulate electrosurgery, and wherein the elastomeric hydrogel defines a predetermined pathway between non-conductive regions to simulate pathways encountered in real surgery for practicing electrosurgical activity.

2. A surgical simulation system for the practice of electrosurgical activity, comprising:
a simulated tissue structure comprising:
an inner layer adjacent to and in contact with an outer layer, wherein the inner layer comprises a foam material, wherein the outer layer comprises an elastomeric hydrogel wherein the inner layer defines an interior cavity, and wherein both the inner layer and the outer layer define a shape of at least a portion of a uterus;
a simulated pathology located adjacent to or embedded in the simulated tissue structure, wherein the simulated pathology is removable from the simulated tissue structure via use of an electrical current; and
at least one tube having a first end and a second end; the tube extending outwardly from the outer layer and configured to mimic the shape of a fallopian tube; the tube comprising silicone containing electro-conductive material,
wherein the elastomeric hydrogel is electro-conductive such that the elastomeric hydrogel is operably severable under application of the electrical current to simulate electrosurgery in a training environment.

3. The surgical simulation system of claim 1 wherein the simulated pathology is made of silicone and untreated fumed silicon dioxide.

4. The surgical simulation system of claim 1 further including an opening to the cavity.

5. The surgical simulation system of claim 1, wherein the training environment is a surgical training device configured to mimic a torso, the training device comprising:
a base; and
a top cover connected to and spaced apart from the base by at least one leg to define an internal cavity between the top cover and the base, wherein the internal cavity is at least partially obstructed from direct observation by a practitioner,
wherein the simulated tissue structure is placed inside the internal cavity.

6. The surgical simulation system of claim 1, wherein the inner layer is made of one or more of silicone elastomers, natural latex, polyurethane elastomers, hydrogels, and styrenic-block-copolymers.

7. The surgical simulation system of claim 1, wherein the outer layer is sized and configured to represent one or more of omentum mesentery, fat, connective tissue, peritoneum, mesothelium, or broad ligaments.

8. The surgical simulation system of claim 1, wherein the simulated pathology comprises one or more of tumors or cysts.

9. The surgical simulation system of claim 8, wherein the one or more tumors comprise intramural tumors or synthetic fibroid tumors.

10. The surgical simulation system of claim 9, wherein the synthetic fibroid tumors comprise one or more of pedunculated submucosal fibroids, subserosal fibroids, submucosal fibroids, pedunculated subserosal fibroids, and intramural fibroids.

11. The surgical simulations system of claim 8, wherein the cysts comprise ovarian cysts.

12. The surgical simulation system of claim 1, wherein the outer layer is calendared or press-formed so as to have a texture and finish that appears to be naturally occurring.

13. The surgical simulation system of claim 1, wherein the outer layer has a plurality of different strong and weak regions.

14. A surgical simulation system for practicing electrosurgery, the system comprising:
at least one outer layer;
a simulated tissue structure comprising:
an inner layer that is adjacent to and in contact with the at least one outer layer, and wherein the inner layer defines a shape of at least a portion of a uterus, and
at least one tube having a first end and a second end, wherein the at least one tube extends outwardly from the at least one outer layer and is configured to define a shape of a fallopian tube; and
one or more simulated pathologies located adjacent to or embedded in the simulated tissue structure, wherein the one or more simulated pathologies are removable from the simulated tissue structure via use of an electrical current, and wherein at least one of the simulated pathologies comprises a simulated ectopic pregnancy that is embedded within the at least one tube,
wherein the at least one outer layer is placed over the simulated tissue structure, wherein the at least one outer layer comprises an elastomeric hydrogel, the elastomeric hydrogel being electro-conductive such that the at least one outer layer is operably severable under application of the electrical current to simulate electrosurgery, and wherein the elastomeric hydrogel defines a predetermined pathway between non-conductive regions to simulate pathways encountered in real surgery for practicing electrosurgical activity.

* * * * *